US006245465B1

(12) United States Patent
Angell et al.

(10) Patent No.: US 6,245,465 B1
(45) Date of Patent: Jun. 12, 2001

(54) NON-AQUEOUS ELECTROLYTE SOLVENTS FOR SECONDARY CELLS

(75) Inventors: Charles Austen Angell, Mesa, AZ (US); Kang Xu, Montgomery Village, MD (US); Igor P. Kovalev; Terje A. Skotheim, both of Tucson, AZ (US)

(73) Assignee: Moltech Corporation, Tucson, AZ (US)

( * ) Notice: Subject to any disclaimer, the term of this patent is extended or adjusted under 35 U.S.C. 154(b) by 0 days.

(21) Appl. No.: 09/172,720

(22) Filed: Oct. 13, 1998

Related U.S. Application Data

(60) Provisional application No. 60/062,124, filed on Oct. 15, 1997.

(51) Int. Cl.[7] .................................... H01M 6/16
(52) U.S. Cl. ........................ 429/340; 429/325; 429/199
(58) Field of Search ...................... 429/340, 324, 429/199, 207, 188, 325

(56) References Cited

U.S. PATENT DOCUMENTS

| | | | |
|---|---|---|---|
| 4,818,644 | * 4/1989 | Armand | 429/192 |
| 4,894,302 | * 1/1990 | Hoffman et al. | 429/194 |
| 5,639,576 | * 6/1997 | Lewis et al. | 429/218 |
| 5,677,082 | * 10/1997 | Greinke et al. | 429/194 |
| 5,965,054 | * 10/1999 | McEwen et al. | 252/62.2 |

FOREIGN PATENT DOCUMENTS

| | | |
|---|---|---|
| 189 891 | 8/1986 | (EP) . |
| 2 516 920 | 5/1983 | (FR) . |
| 1 189 561 | 4/1970 | (GB) . |

OTHER PUBLICATIONS

Patent Abstracts of Japan, "Nonaqueous Electrolytic Solution and Nonaqueous Electrolytic Solution Battery," pertaining to Publication No. JP 9–167635, published Jun. 24, 1997.

* cited by examiner

*Primary Examiner*—Stephen Kalafut
*Assistant Examiner*—R. Alejandro
(74) *Attorney, Agent, or Firm*—Morrison & Foerster LLP

(57) ABSTRACT

The present invention pertains to non-aqueous electrolyte solvents which comprise a non-symmetrical, non-cyclic sulfone and which are suitable for use in secondary electric current producing cells. The present invention also pertains to electrolyte elements comprising such solvents, electric current producing cells comprising such electrolyte elements, and methods for making such electric current producing cells. More particularly, the present invention pertains to electrolyte elements comprising a non-aqueous electrolyte solvent, which solvent comprises a non-symmetrical, non-cyclic sulfone of the general formula $R^1$—$SO_2$—$R^2$, wherein $R^1$ and $R^2$ are independently linear or branched alkyl or partially or fully fluorinated linear or branched alkyl groups having 1 to 7 carbon atoms, wherein $R^1$ and $R^2$ are different, and wherein —$SO_2$— denotes the sulfone group.

49 Claims, 6 Drawing Sheets

NON-AQUEOUS ELECTROLYTE SOLVENTS FOR SECONDARY CELLS

RELATED APPLICATION

This application claims priority under 35 U.S.C. § 119(e) to U.S. provisional application Se. No. 60/062,124, filed Oct. 15, 1997, the contents of which are incorporated herein by reference in their entirety.

GOVERNMENT SUPPORT

Parts of the invention described in this application may have been made with the aid of U.S. government support. As such, the U.S. government may have certain rights in the invention.

TECHNICAL FIELD

The present invention pertains generally to the field of non-aqueous electrolyte solvents for use in secondary electric current producing cells incorporating negative electrodes comprising highly reactive alkali metals or ions. More particularly, the present invention pertains to non-aqueous electrolyte solvents which comprise a non-symmetrical, non-cyclic sulfone and which are suitable for use in secondary electric current producing cells. The present invention also pertains to electrolyte elements comprising such solvents, electric current producing cells comprising such electrolyte elements, and methods for making such electric current producing cells.

BACKGROUND

Throughout this application, various publications, patents, and published patent applications are referred to by an identifying citation. The disclosures of the publications, patents, and published patent specifications referenced in this application are hereby incorporated by reference into the present disclosure to more fully describe the state of the art to which the invention pertains.

As the rapid evolution of batteries continues, and in particular as secondary electric batteries such as lithium-ion and lithium metal batteries become more widely accepted for a variety of uses, the need for safe, long lasting (greater than 200 cycles) rechargeable cells becomes increasingly important. U.S. Pat. Nos. 5,460,905; 5,462,566; 5,582,623; and 5,587,253 describe the basic elements and performance requirements of secondary lithium batteries and their components. A key issue in the development of high energy secondary batteries is the choice of the electrolyte element to improve the cycle life and safety of the battery.

One of the many problems encountered in the process of producing electrolyte elements is that there is a difficulty in obtaining good cycling efficiency, cycle life, and safety of the cells due to the reactivity of the electrolyte element with the electrode elements, particularly due to reactions with the anode. This is especially true with anodes comprising lithium, which is highly reactive. Reactions of lithium with the electrolyte are undesirable as they lead to self discharge and early battery failure. The reaction of lithium with organic electrolyte solvents may also result in the formation of a surface film on the anode, which subsequently reduces the efficiency of the anode, and may cause uneven plating that can lead to dendrite formation. These factors limit the number of potential electrolyte solvents that may be used for dissolving appropriate electrolyte salts and other additives to form the electrolyte element.

Desirable electrolyte elements provide high cycling efficiency, good ionic conductivity, and reasonable cost. The number of times a lithium battery can be recharged is dependent on the efficiency of each charge and discharge cycle of the cell and provides a measure of the cycling efficiency. By cycling efficiency is meant the percent of the lithium (or other anode material) which is replated or reduced onto the anode upon full charging compared to the amount of lithium freshly stripped or oxidized from the anode on the previous full discharging of the cell. Any deviation in this percentage from 100 percent represents lithium which has been lost in terms of useful availability for the charge/discharge performance of the cell. Cycling efficiency is primarily a function of the ability of the electrolyte solvent to withstand reduction by lithium, which is a powerful reducing agent.

Safety factors affecting the choice of electrolyte solvents include the safety margin against overcharge of the cell. The overcharge safety margin is determined by the voltage difference between completion of recharge of the electrodes and the decomposition of the electrolyte. For instance, in lithium-ion cells, the difference in potential of the anode and cathode is about 4 V. Tarascon and Guyomard, *J. Electrochem. Soc.*, 1991, 138, 2864–2868, describe the upper voltage range of a potential scan being limited to 4.5 V vs. Li/Li$^+$ because of breakdown of the electrolyte at higher potentials (4.6 V vs. Li/Li$^+$) in a 1M LiClO$_4$ 50:50 EC (ethylene carbonate):DME (dimethoxyethane) electrolyte. Also, for example, Ein-Eli et al., *J. Electrochem. Soc.*, 1997, 144, L205–L207, report the onset of electrolyte oxidation at 5.1 V for an electrolyte composition comprising 1.2M LiPF$_6$ ethylene carbonate:dimethyl carbonate (2:3 by volume). The need for electrolyte compositions which do not decompose at high potentials is emphasized by the recent recommendation of Zhong et al., *J. Electrochem. Soc.*, 1997, 144, 205–213, that certain lithium-ion cathode materials should be charged to above 5 V.

Further factors affecting the choice of electrolyte solvents can be illustrated by reference to cells comprising intercalated carbon electrodes. Ein-Eli et al., *J. Electrochem. Soc.*, 1996, 143, L273–277, recently reported that graphite electrodes, which are usually sensitive to the composition of the electrolyte solution, can be successfully cycled at high reversible capacities in electrolytes comprising ethylmethyl carbonate. These results are interesting because lithium ions cannot intercalate into graphite in diethyl carbonate solutions and cycle poorly in dimethyl carbonate solutions.

A large number of non-aqueous organic solvents have been suggested and investigated as electrolytes in connection with various types of cells containing lithium electrodes. U.S. Pat. Nos. 3,185,590; 3,578,500; 3,778,310; 3,877,983; 4,163,829; 4,118,550; 4,252,876; 4,499,161; 4,740,436; and 5,079,109 describe many possible electrolyte element combinations and electrolyte solvents, such as borates, substituted and unsubstituted ethers, cyclic ethers, polyethers, esters, sulfones, alkylene carbonates, organic sulfites, organic sulfates, organic nitrites and organic nitro compounds.

One class of organic electrolyte solvents that have received attention as a component of electrolyte elements for electrochemical cells and other devices are the sulfones. Sulfones can be divided into two types: the cyclic or aromatic sulfones, commonly referred to as sulfolanes; and the aliphatic sulfones. Sulfones form a potentially attractive group of organic solvents which present a high chemical and thermal stability.

The use of the cyclic sulfones, sulfolane (tetramethylenesulfone) along with its alkyl-substituted derivatives, 3-methylsulfolane and 2,4-dimethysulfolane, as electrolyte solvents has been investigated.

U.S. Pat. No. 3,907,597 to Mellors describes a liquid organic electrolyte consisting essentially of sulfolane or its liquid alkyl-substituted derivatives in combination with a co-solvent, preferably a low viscosity solvent such as 1,3-dioxolane, and an ionizable salt. Sulfolane and its liquid alkyl-substituted derivatives, such as 3-methyl sulfolane, are good non-aqueous solvents but have the disadvantage in that they have a relatively high viscosity. Thus, when metal salts are dissolved in these solvents for the purpose of improving the ionic conductivity of the solvents, the viscosity of the solvent and the salt becomes too high for its efficient use as an electrolyte for non-aqueous cell applications. For example, in the '597 patent, sulfolane is used in combination with a low viscosity co-solvent to overcome the viscosity problem.

Japanese patent publications numbers JP 08-298229, published Nov. 12, 1996 and JP 08-298230, published Nov. 12, 1996, describe electrolytes for electric double layer capacitors which comprise sulfolane as one of the electrolyte components.

U.S. Pat. No. 4,725,927 to Morimoto et al. describes the use of sulfolane and its derivatives, 3-methylsulfolane and 2,4-dimethylsulfolane, for use in electric double layer capacitors. However they note that a sulfolane solvent has a high viscosity and a relatively high solidification temperature. Therefore, when it is used for an electrolyte solution, the ionic conductivity tends to be low.

U.S. Pat. No. 5,079,109 to Takami et al. describes a non-aqueous electrolyte solvent blend that may comprise sulfolane as one of the components for use in rechargeable lithium secondary batteries. U.S. Pat. No. 5,219,684 to Wilkinson et al. describes an electrolyte consisting essentially of sulfolane and a glyme for an electrochemical cell comprising a lithium containing anode and a cathode, including $Li_xMnO_2$ cathode active material.

U.S. Pat. No. 4,550,064 to Yen et al. describes electrolytes with sulfolane type solvents which have relatively high dielectric constants and low vapor pressure. Electrolytes containing sulfolane also exhibit improved stripping/plating cycling efficiency because of the excellent reduction stability. However, the use of sulfolane solvents is inhibited by incompatibility of the polar sulfolane liquid with the hydrophobic separator and with the non-polar binder of the cathode. Methods to improve the wettability of the separator and the cathode electrode are described.

The use of the aliphatic sulfones, dimethylsulfone and dipropylsulfone, has been investigated as electrolyte solvents. U.S. Pat. No. 4,690,877 to Gabano et al. reports electrolyte compositions containing at least one aromatic or aliphatic linear sulfone for use in cells operable at temperatures between 100° C. and 200° C. Particularly preferred was dimethylsulfone.

Sulfone-based electrolytes comprising dimethylsulfone, dipropylsulfone, and sulfolane have been described by J. Pereira-Ramos et al., *J. Power Sources*, 1985, 16, 193–204 for use in lithium intercalation batteries. Molten dimethylsulfone at 150° C. as an electrolyte for a rechargeable γ-$MnO_2$ lithium battery is described by Bach et al., J. Power Sources, 1993, 43–44, 569–575.

U.S. Pat. Nos. 4,060,674 and 4,104,451 to Klemann and Newman describe electrolyte compositions for reversible alkali metal cells which consist essentially of a solvent and an electronically active alkali metal salt. Organic electrolyte solvents employed are generally ones selected from the group consisting of inertly substituted and unsubstituted ethers, esters, sulfones, organic sulfites, organic sulfates, organic nitrites or organic nitro compounds. Examples of organic solvents include propylene carbonate, tetrahydrofuran, dioxolane, furan, sulfolane, dimethyl sulfite, nitrobenzene, nitromethane and the like. The preferred solvents are ethers, and preferred is an electrolyte solvent containing dioxolane.

JP patent publication number JP 09-147913, published Jun. 6, 1997, describes electrolyte solvents containing sulfones of the formula $R^1$—$SO_2$—$R^2$, where $R^1$ and $R^2$ are $C_{1-4}$ alkyl groups, and $R^1$ and $R^2$ are different. Preferably the anodes are Li interaction carbonaceous anodes.

Despite the numerous electrolyte solvents proposed for use in rechargeable cells, there remains a need for improved non-aqueous electrolyte solvents that provide beneficial effects during the useful life of the cell, and which can be incorporated easily and reliably into the cell without significant extra cost.

It is therefore an object of the present invention to provide an improved non-aqueous electrolyte solvent which is suitable for use in rechargeable cells.

It is yet a further object of the present invention to provide a non-aqueous electrolyte solvent which has greater overcharge safety margins.

It is yet a further object of the present invention to provide a non-aqueous electrolyte solvent with high ionic conductivity and low solvent volatility.

It is a further object of this invention to provide an improved non-aqueous electrolyte solvent for electrochemical cells which comprise alkali metal negative electrodes.

Yet another object of the present invention is to provide a non-aqueous electrolyte solvent that is useful with both lithium metal and lithium-ion anodes for secondary battery cells.

It is a further object of the present invention to provide a non-aqueous electrolyte solvent that provides for reversible intercalation of lithium into graphite.

It is a further object of the present invention to provide a non-aqueous electrolyte solvent that increases the cycle life and safety of secondary cells.

It is yet a further object of the present invention to provide secondary lithium cells employing the electrolytes of the present invention and methods of making such cells.

SUMMARY OF THE INVENTION

The present invention pertains to non-aqueous electrolyte solvents which comprise a non-symmetrical, non-cyclic sulfone and which are suitable for use in secondary electric current producing cells. The present invention also pertains to electrolyte elements comprising such solvents, electric current producing cells comprising such electrolyte elements, and methods for making such electric current producing cells.

One aspect of the present invention pertains to electrolyte elements which comprise one or more ionic electrolyte salts and a non-aqueous electrolyte solvent, which solvent comprises one or more non-symmetrical, non-cyclic sulfones, as described herein, and optionally other additives, such as one or more electrolyte co-solvents, gelling agents, jonically conductive solid polymers, and/or other additives.

In one embodiment, the electrolyte element comprises one or more ionic electrolyte salts and a non-aqueous electrolyte solvent, which solvent comprises one or more non-symmetrical, non-cyclic sulfones of the general formula:

$R^1$—$SO_2$—$R^2$ wherein $R^1$ and $R^2$ are independently linear or branched alkyl or partially or fully fluorinated linear or branched alkyl groups having 1 to 7 carbon atoms; wherein $R^1$ and $R^2$ are different; and wherein —$SO_2$— denotes the sulfone group. In one embodiment, $R^1$ and $R^2$ have 1 to 4 carbon atoms.

In one embodiment, the non-aqueous electrolyte solvent comprises one or more non-symmetrical, non-cyclic sulfones of the general formula:

$R^1$—$SO_2$—$R^2$ wherein $R^1$ and $R^2$ are independently linear or branched alkyl groups having 1 to 7 carbon atoms; wherein $R^1$ and $R^2$ are different. In one embodiment, $R^1$ and $R^2$ have 1 to 4 carbon atoms.

In one embodiment, the alkyl group is selected from the group consisting of: methyl (—$CH_3$), ethyl (—$CH_2CH_3$), n-propyl (—$CH_2CH_2CH_3$), n-butyl (—$CH_2CH_2CH_2CH_3$), n-pentyl (—$CH_2CH_2CH_2CH_2CH_3$), n-hexyl (—$CH_2CH_2CH_2CH_2CH_2CH_3$), n-heptyl (—$CH_2CH_2CH_2CH_2CH_2CH_2CH_3$), iso-propyl (—$CH(CH_3)_2$), iso-butyl (—$CH_2CH(CH_3)_2$), sec-butyl (—$CH(CH_3)(CH_2CH_3)$), tert-butyl (—$C(CH_3)_3$), and iso-pentyl (—$CH_2CH_2CH(CH_3)_2$).

In a preferred embodiment, the sulfone is ethylmethyl sulfone. In another preferred embodiment, the sulfone is ethyl-sec-butyl sulfone. In a more preferred embodiment, the electrolyte solvent comprises ethyl-sec-butyl sulfone in combination with electrolyte S co-solvent ethylene carbonate.

Another preferred embodiment of the present invention pertains to electrolyte elements comprising one or more ionic electrolyte salts and a non-aqueous electrolyte solvent, which solvent comprises one or more novel, partially or fully fluorinated, non-symmetrical, non-cyclic sulfones of the general formula:

$R^1$—$SO_2$—$R^2$ wherein $R^1$ is a partially or fully fluorinated linear or branched alkyl group having 1 to 7 carbon atoms, $R^2$ is a linear or branched alkyl or partially or fully fluorinated linear or branched alkyl group having 1 to 7 carbon atoms, wherein $R^1$ and $R^2$ are different; and wherein —$SO_2$— denotes the sulfone group. In one embodiment, $R^1$ and $R^2$ have 1 to 4 carbon atoms.

In one embodiment, the non-symmetrical, non-cyclic sulfone comprises one or more terminal trifluoromethyl (—$CF_3$) groups. In one embodiment, the non-symmetrical, non-cyclic sulfone comprises one or more —$CF_2$— groups. In one embodiment, the non-symmetrical, non-cyclic sulfone comprises one or more —CF< groups.

In one embodiment, the fluorinated alkyl group is selected the group consisting of: trifluoromethyl (—$CF_3$), 2,2,2-trifluoroethyl (—$CH_2CF_3$), 1,1-difluoroethyl (—$CF_2CH_3$), perfluoroethyl (—$CF_2CF_3$), 3,3,3-trifluoro-n-propyl (—$CH_2CH_2CF_3$), 2,2-difluoro-n-propyl (—$CH_2CF_2CH_3$), 1,1-difluoro-n-propyl (—$CF_2CH_2CH_3$), 2,2,3,3,3-pentafluoro-n-propyl (—$CH_2CF_2CF_3$), 1,1,3,3,3-pentafluoro-n-propyl (—$CF_2CH_2CF_3$), perfluoro-n-propyl (—$CF_2CF_2CF_3$), perfluoro-n-butyl (—$CF_2CF_2CF_2CF_3$), perfluoro-n-pentyl (—$CF_2CF_2CF_2CF_2CF_3$), perfluoro-n-hexyl (—$CF_2CF_2CF_2CF_2CF_2CF_3$), perfluoro-n-heptyl (—$CF_2CF_2CF_2CF_2CF_2CF_2CF_3$)—$CF(CH_3)_2$, —$CH(CH_3)(CF_3)$, —$CH(CF_3)_2$, —$CF(CF_3)_2$, —$CF_2CH(CH_3)_2$, —$CH_2CF(CH_3)_2$, —$CH_2CH(CH_3)(CF_3)$, —$CH_2CH(CF_3)_2$, —$CF_2CF(CF_3)_2$, and —$C(CF_3)_3$.

In one embodiment the alkyl group is selected as described herein.

In a preferred embodiment, the fluorinated sulfone is $CF_3CH_2CH_2SO_2CH_3$ ($CF_3EMSF$). In a more preferred embodiment, the fluorinated sulfone is 2,2,2-trifluoroethylmethyl sulfone ($CF_3CH_2SO_2CH_3$, ($CF_3MMSF$)), which exhibits very high conductivity, for example, in lithium chlorate solutions.

In some embodiments, the fluorinated non-symmetrical, non-cyclic sulfones further offer superior wetting, penetration and other surfactant properties. In one embodiment, the ionic electrolyte salt is selected from the group consisting of $MClO_4$, $MAsF_6$, $MSCN$, $MSO_3CF_3$, $MSO_3CH_3$, $MBF_4$, $MB(Ph)_4$, $MPF_6$, $MC(SO_2CF_3)_3$, $MN(SO_2CF_3)_2$, $MNSO_2CF_2CF_2CF_2CF_2SO_2$,

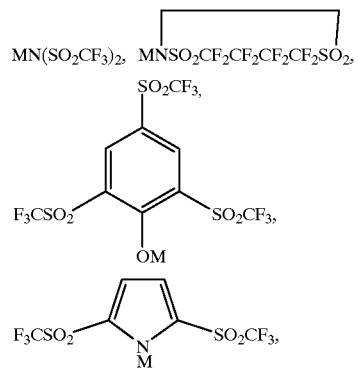

and the like, where M is Li or Na. In a preferred embodiment, the ionic electrolyte salt is selected from the group consisting of $LiClO_4$, $LiSO_3CF_3$ and $LiN(SO_2CF_3)_2$. In a more preferred embodiment, the ionic electrolyte salt is $LiN(SO_2CF_3)_2$.

In one embodiment, the electrolyte element of the present invention further comprises one or more liquid electrolyte co-solvents. Suitable liquid electrolyte co-solvents include carbonates N-methyl acetamide, acetonitrile, symmetric sulfones, sulfolanes, polyethylene glycols, 1,3-dioxolanes, glymes, siloxanes, and ethylene oxide grafted siloxanes; and blends thereof. Examples of suitable carbonates include, but are not limited to, ethylene carbonate (EC), propylene carbonate (PC). Examples of suitable glymes include, but are not limited to, tetraethyleneglycol dimethyl ether (TEGDME) and 1,2-dimethoxyethane.

In one embodiment, the electrolyte element comprises a liquid electrolyte. In one embodiment, the electrolyte element further comprises a porous separator.

In one embodiment, the electrolyte element of the present invention further comprises a polymer electrolyte or gel polymer electrolyte.

Suitable polymer electrolytes include polyethers, polyethylene oxides (PEO), polyimides, polyphosphazenes, polyacrylonitriles (PAN), polysiloxanes, polyether grafted polysiloxanes, derivatives of the foregoing, copolymers of the foregoing, crosslinked and network structures of the foregoing, blends of the foregoing, and the like, to which is added an appropriate ionic electrolyte salt.

Suitable gel-polymer electrolytes include those prepared from polymer matrices derived from polyethylene oxides, polypropylene oxides, polyacrylonitriles, polysiloxanes, polyimides, polyethers, sulfonated polyimides, perfluorinated membranes (NafionTM resins), divinyl polyethylene glycols, polyethylene glycol-bis-(methyl acrylates), polyethylene glycol-bis(methyl methacrylates), derivatives of the foregoing, copolymers of the foregoing, crosslinked and network structures of the foregoing, blends of the foregoing, to which is added an appropriate ionic electrolyte salt.

In one embodiment, the electrolyte element of the present invention has a stability to oxidation of greater than 5.0 V vs. lithium. In another embodiment, the electrolyte element of the present invention has a stability to oxidation of greater than 5.5 V vs. lithium.

In one embodiment, the electrolyte element further comprises a polysulfide additive.

Still another aspect of the present invention pertains to an electric current producing cell which comprises:
(a) an anode;
(b) a cathode; and
(c) a non-aqueous electrolyte element that is stable in the presence of the anode and the cathode, wherein the electrolyte element comprises a non-symmetrical, non-cyclic sulfone, as described herein.

In one embodiment of the cell of the present invention, the anode comprises one or more metals or metal alloys, or mixtures thereof, wherein said metals are selected from the group consisting of the group IA and IIA metals in the Periodic Table. Preferred anodes are lithium metal, lithium-aluminum alloys, lithium-tin alloys, lithium-intercalated carbons, and lithium-intercalated graphites.

In one embodiment of the cell of the present invention, the cathode comprises a cathode active material selected from the group consisting of: inorganic insertion oxides and sulfides, metal chalcogenides, elemental sulfur, organo-sulfur polymers, carbon-sulfur polymers, conjugated polymers and liquid cathodes. In one embodiment, the cathode active material is a lithiated metal oxide. Examples of suitable lithiated metal oxides include, but are not limited to, $MnO_2$, $Mn_2O_4$, $CoO_2$, $NiO_2$, $V_6O_{13}$, $V_2O_5$, and the like as described herein. In one embodiment of the cell of the present invention, the cathode comprises organo-sulfur polymers, carbon-sulfur polymers and elemental sulfur, as described herein.

Yet another aspect of the invention pertains to a method of making an electric current producing cell, said method comprising the steps of:
(a) providing an anode;
(b) providing a cathode; and
(c) enclosing a non-aqueous electrolyte element that is stable in the presence of the anode and the cathode between said anode and said cathode, wherein the electrolyte element comprises a non-symmetrical, non-cyclic sulfone, as described herein.

As will be appreciated by one of skill in the art, features of one aspect or embodiment of the invention are also applicable to other aspects or embodiments of the invention.

BRIEF DESCRIPTION OF THE DRAWINGS

FIG. 3 shows the comparison of oxidative decomposition potential vs. Li for various electrolytes on the surface of a composite cathode comprising $Li_xMn_2O_4$ as the electroactive material (Example 4).

FIG. 4 illustrates the reversible intercalation of lithium into graphite electrodes without the occurrence of exfoliation.

DETAILED DESCRIPTION OF THE INVENTION

Figure 1:
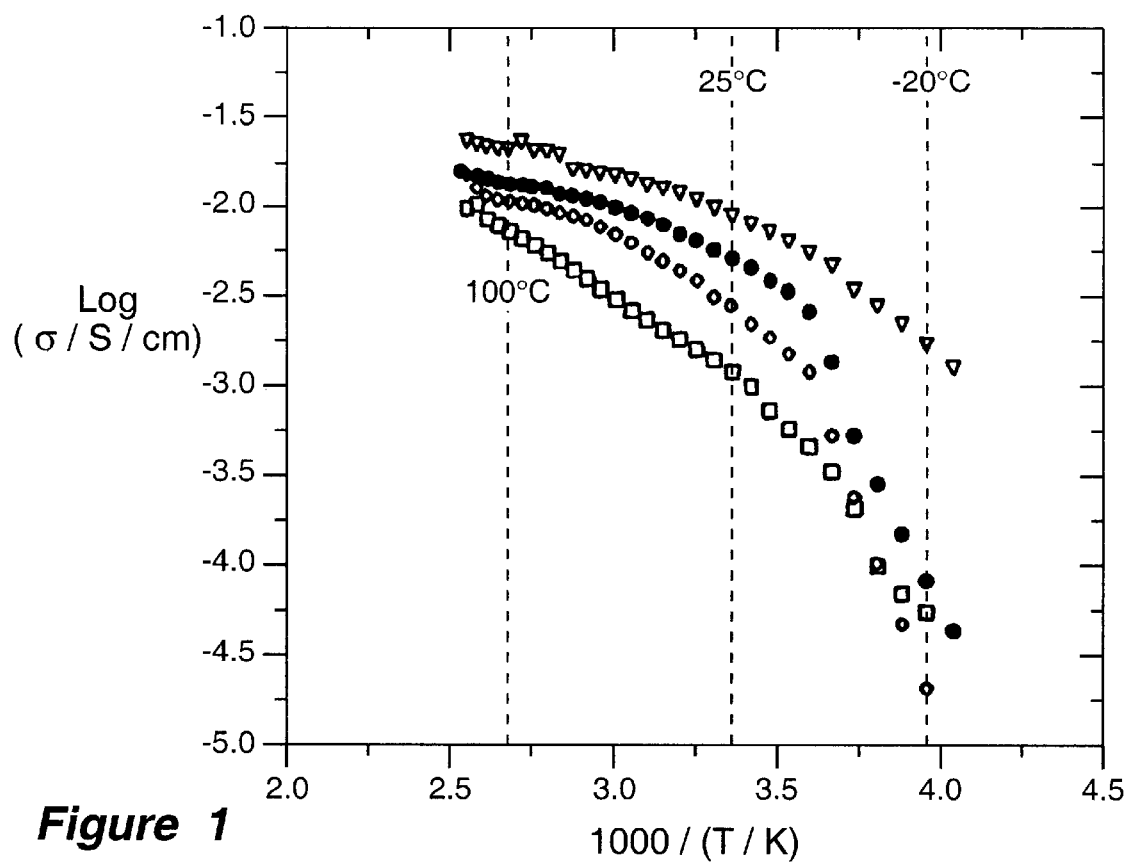
FIG. 1 shows the DC (direct current) electrical conductivities of four examples of the present invention vs. the reciprocal temperature: ● 1 M $LiN(CF_3SO_2)_2$ (lithium imide) in ethylmethyl sulfone (EMSF); □ 1 M $LiClO_4$ in EMSF; ◊ 1 M $LiPF_6$ in EMSF; and ▽ 1 M $LiClO_4$ in 2,2,2-trifluoroethylmethyl sulfone ($CF_3MMSF$). DC conductivities were measured as described in Example 3.

The present invention pertains to non-aqueous electrolyte solvents which comprise a non-symmetrical, non-cyclic sulfone and which are suitable for use in secondary electric current producing cells. The present invention also pertains to electrolyte elements comprising such solvents, electric current producing cells comprising such electrolyte elements, and methods for making such electric current producing cells.

Electrolyte Elements

Electrolyte elements are useful in electrolytic cells, rechargeable batteries, electric capacitors, fuel cells, and the like, and function as a medium for storage and transport of ions. Any liquid, solid, or solid-like material capable of storing and transporting ions may be used, so long as the material is chemically inert with respect to the anode and the cathode, and the material facilitates the transportation of ions between the anode and the cathode. In the special case of solid electrolytes, these materials may additionally function as separator materials between the anodes and cathodes.

One aspect of the present invention pertains to electrolyte elements. The term "electrolyte element," as used herein, relates to an element of a secondary cell which comprises an electrolyte solvent, one or more electrolyte salts, and optionally other additives, including, but not limited to, polymer electrolytes and gel-polymer electrolytes.

The electrolyte elements of the present invention comprise one or more ionic electrolyte salts and a non-aqueous electrolyte solvent, which solvent comprises one or more non-symmetrical, non-cyclic sulfones, as described herein, and optionally other additives, such as one or more electrolyte co-solvents, gelling agents, ionically conductive solid polymers, and/or other additives. The electrolyte elements of the present invention may be prepared by dissolving one or more ionic electrolyte salts in one or more non-aqueous electrolyte solvents.

Thus, the electrolyte elements of the present invention comprise a non-aqueous electrolyte solvent, said solvent comprising a non-symmetrical, non-cyclic sulfone of the general formula:

$$R^1\text{—}SO_2\text{—}R^2$$

wherein $R^1$ and $R^2$ are independently linear or branched alkyl or partially or fully fluorinated linear or branched alkyl groups having 1 to 7 carbon atoms; wherein $R^1$ and $R^2$ are different; and wherein —$SO_2$— denotes the sulfone group. In one embodiment, $R^1$ and $R^2$ have 1 to 4 carbon atoms.

Examples of linear alkyl groups having 1 to 7 carbon atoms include methyl (—$CH_3$), ethyl (—$CH_2CH_3$), n-propyl (—$CH_2CH_2CH_3$), n-butyl (—$CH_2CH_2CH_2CH_3$), n-pentyl (—$CH_2CH_2CH_2CH_2CH_3$), n-hexyl (—$CH_2CH_2CH_2CH_2CH_2CH_3$), and n-heptyl (—$CH_2CH_2CH_2CH_2CH_2CH_2CH_3$).

Examples of branched alkyl groups having 1 to 7 carbon atoms include, but are not limited to, iso-propyl (—$CH(CH_3)_2$), iso-butyl (—$CH_2CH(CH_3)_2$), sec-butyl (—$CH(CH_3)(CH_2CH_3)$), tert-butyl (—$C(CH_3)_3$), and iso-pentyl (—$CH_2CH_2CH(CH_3)_2$).

Examples of linear fluorinated alkyl groups having 1 to 7 carbon atoms include, but are not limited to, trifluoromethyl (—$CF_3$), 2,2,2-trifluoroethyl (—$CH_2CF_3$), 1,1-difluoroethyl (—$CF_2CH_3$), perfluoroethyl (—$CF_2CF_3$), 3,3,3-trifluoro-n-propyl (—$CH_2CH_2CF_3$), 2,2-difluoro-n-propyl (—$CH_2CF_2CH_3$), 1,1-difluoro-n-propyl (—$CF_2CH_2CH_3$), 2,2,3,3,3-pentafluoro-n-propyl (—$CH_2CF_2CF_3$), 1,1,3,3,3-pentafluoro-n-propyl (—$CF_2CH_2CF_3$), perfluoro-n-propyl (—$CF_2CF_2CF_3$), perfluoro-n-butyl (—$CF_2CF_2CF_2CF_3$), perfluoro-n-pentyl (—$CF_2CF_2CF_2CF_2CF_3$), perfluoro-n-hexyl (—$CF_2CF_2CF_2CF_2CF_2CF_3$), and perfluoro-n-heptyl (—$CF_2CF_2CF_2CF_2CF_2CF_2CF_3$).

Examples of branched fluorinated alkyl groups having 1 to 7 carbon atoms include, but are not limited to, —$CF(CH_3)_2$, —$CH(CH_3)(CF_3)$, —$CH(CF_3)_2$, —$CF(CF_3)_2$, —$CF_2CH(CH_3)_2$, —$CH_2CF(CH_3)_2$, —$CH_2CH(CH_3)(CF_3)$, —$CH_2CH(CF_3)_2$, —$CF_2CF(CF_3)_2$ and —$C(CF_3)_3$.

Preferred among the non-cyclic, non-symmetrical sulfones are ethylmethyl sulfone (EMSF, $CH_3CH_2$—$SO_2$—$CH_3$), ethyl-iso-propyl sulfone (EiPSF, $CH_3CH_2$—$SO_2$—$CH(CH_3)_2$), ethyl-sec-butyl sulfone (ESBSF, $CH_3CH_2$—$SO_2$—$CH(CH_3)(CH_2CH_3)$), ethyl-iso-butyl sulfone (EiBSF, $CH_3CH_2$—$SO_2$—$CH_2CH(CH_3)_2$). Most preferred are EMSF and EsBSF as solvents, which exhibit exceptionally high conductivity combined with high chemical and electrochemical stability. Particularly most preferred is EMSF, which has high stability in the presence of alkali metals.

Preferred among the fluorinated, non-cyclic, non-symmetrical sulfones are those substituted with perfluoromethyl (trifluoromethyl, $CF_3$—), perfluoromethylene (—$CF_2$—) or —$CF$< groups. More preferred are $CF_3CH_2SO_2CH_3$ (2,2,2-trifluoroethylmethyl sulfone, $CF_3MMSF$) and $CF_3CH_2CH_2SO_2CH_3$ ($CF_3EMSF$). Especially preferred is $CF_3MMSF$ which exhibits very high conductivity, for example in lithium chlorate solutions.

The electrolyte elements of the present invention also comprise one or more ionic electrolyte salts. Suitable ionic electrolyte salts include, but are not limited to, any of those commonly used with secondary lithium metal and lithium-ion cells as described in the various references cited herein. Examples of ionic electrolyte salts for use in electrolyte elements of the present invention include, but are not limited to, $MClO_4$, $MAsF_6$, $MSCN$, $MSO_3CF_3$, $MSO_3CH_3$, $MBF_4$, $MB(Ph)_4$, $MPF_6$, $MC(SO_2CF_3)_3$, $MN(SO_2CF_3)_2$, $MNSO_2CF_2CF_2CF_2CF_2SO_2$,

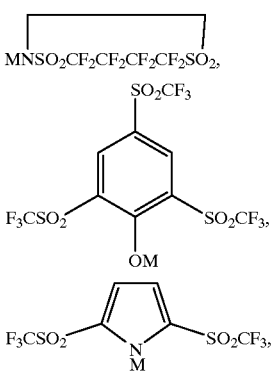

and the like, where M is Li or Na. Other electrolyte salts useful in the practice of this invention are disclosed in U.S. Pat. No. 5,538,812 to Lee et al. For high voltage applications, highly oxidation-resistant salts of $MClO_4$, $MSO_3CF_3$ and $MN(SO_2CF_3)_2$ are preferred. Thus, one group of preferred electrolyte salts includes $LiClO_4$, lithium imide and lithium triflate ($LiSO_3CF_3$). Especially preferred are electrolyte solutions comprising $MN(SO_2CF_3)_2$ as the electrolyte salt, which exhibits exceptionally high conductivity combined with high chemical and electrochemical stability.

Optionally, the electrolyte elements of the present invention may further comprise one or more liquid electrolyte co-solvents (i. e., in addition to a non-symmetrical, non-cyclic sulfone), gelling agents, ionically conductive solid polymers, and other additives. Suitable electrolyte co-solvents, gelling agents or ionically conductive solid polymers include any of those commonly used with secondary lithium metal and lithium-ion cells as described in the various references cited herein.

For example, suitable liquid electrolyte co-solvents for use in the electrolyte elements of the present invention include, but are not limited to, any one of the commonly used electrolyte solvents as described in the various references cited herein. Examples of useful liquid electrolyte co-solvents include carbonates, N-methyl acetamide, acetonitrile, symmetric sulfones, sulfolanes, 1,3-dioxolanes, glymes, polyethylene glycols, siloxanes, and ethylene oxide grafted siloxanes, and blends thereof, and the like. Examples of useful carbonates include, but are not limited to, ethylene carbonate (EC) and propylene carbonate (PC). Examples of useful glymes includes, but are not limited to, tetraethyleneglycol dimethyl ether (TEGDME) and 1,2-dimethoxyethane.

Liquid electrolyte elements are often used in combination with one of the common porous separators as described in the various references cited herein. Liquid electrolyte solvents or plasticizing agents are often themselves useful as gel forming agents for gel-polymer electrolytes.

Examples of gelling agents which are useful in the electrolyte elements of the present invention include, but are not limited to, those prepared from polymer matrices derived from polyethylene oxides (PEO), polypropylene oxides, polyacrylonitriles, polysiloxanes, polyimides, polyethers, sulfonated polyimides, perfluorinated membranes (Nafion™ resins), polyethylene glycols, polyethylene glycol-bis-(methyl acrylates), polyethylene glycol-bis (methyl methacrylates), derivatives of the foregoing, copolymers of the foregoing, crosslinked and network structures of the foregoing, blends of the foregoing, and the like.

Examples of ionically conductive solid polymers suitable for use in the electrolyte elements of the present invention include, but are not limited to, those comprising polyethers, polyethylene oxides (PEO), polyimides, polyphosphazenes, polyacrylonitriles (PAN), polysiloxanes, polyether grafted polysiloxanes, derivatives of the foregoing, copolymers of the foregoing, crosslinked and network structures of the foregoing, blends of the foregoing, and the like, to which is added an appropriate ionic electrolyte salt. Tonically conductive solid polymers electrolytes may additionally function as separator materials between the anode and cathode.

Other additives which are useful in the electrolyte elements of the present invention include soluble additives. These include carbon dioxide and other inorganic additives, such as those described in Besenhard, et al., *J. Power Sources*, 1993, 43–44, 413–420 and references therein; acid anhydrides as described in U.S. Pat. No. 5,296,319 to Bito, et al., to reduce or eliminate the presence of water; an unidentified reaction product of carbon disulfide and lithium, possibly a soluble sulfide, in U.S. Pat. No. 3,532,543; high concentrations of water in U.S. Pat. Nos. 5,432,425 and 5,436,549 to Lundquist et al.; and polysulfide additives as described in U.S. patent application Ser. No. 08/664,110 to the common assignee and references therein.

The non-aqueous electrolyte solvents of the present invention (which comprise one or more non-symmetrical, non-cyclic sulfones, as described herein) are particularly preferred for use in electrolytic cells, rechargeable batteries, electric capacitors, fuel cells, and the like, which comprise non-aqueous electrolyte elements and which require high energy storage capacity, long shelf life, and a low rate of self-discharge. The electrolyte solvents of the present invention are particularly useful in electrolytic cells comprising alkali-metal-containing electrodes, and particularly to lithium intercalation electrodes.

Many electrolyte solvents and electrolyte salts, and combinations thereof, have been proposed for use as the electrolyte element in secondary cells. Many factors affect the choice of electrolyte element such as cycle life, safety, and the reactivity of the cell components, particularly the anode with the electrolyte. The safety factor is perhaps one of the most important governing the choice of the electrolyte element for a particular cell combination of anode and cathode. A critical safety feature is the capability of the cell to withstand overcharge, which can led to electrolyte decomposition. The overcharge safety margin is determined by the voltage difference between completion of recharge of the electrodes and the decomposition of the electrolyte element.

The electrolyte elements of the present invention have been found to show improved safety and are capable of withstanding cell overcharge to a greater extent than previously known electrolyte elements. In many embodiments, the novel electrolyte elements of the present invention (which comprise a non-cyclic, non-symmetrical sulfone, as described herein) are capable of withstanding voltage differences between the anode and cathode of greater than 5 volts vs. lithium. Such non-cyclic, non-symmetrical sulfones are also found to be stable in the presence of alkali metals, particularly lithium.

Further it has been found that certain non-aqueous electrolyte solvents of the present invention, such as those comprising EsBSF, show the ability to reversibly intercalate alkali metals into graphite. This is particularly useful in the application of the electrolyte solvents of the present invention to electrolytic cells that comprise electrodes that undergo intercalation/deintercalation of lithium ions during cell cycling.

Unlike the cyclic sulfones, which are commonly known as sulfolanes, the non-symmetric, non-cyclic sulfone electrolyte solvents of the present invention show remarkably high resistance to oxidation, while simultaneously yielding electrolyte elements of high ambient temperature ionic conductivity.

FIG. 1 shows the DC electrical conductivities of electrolytes of various solutions of alkali metal salts in EMSF and $CF_3MMSF$ ($CF_3CH_2SO_2CH_3$). A 1 M lithium imide solution of ESMF exhibits remarkably high conductivity of up to $10^{-2.2}$ Scm$^{-1}$. Even higher conductivity of $10^{-2.05}$ Scm$^{-1}$ at ambient temperature is obtained by perfluorinating one or more of the alkyl groups of the sulfone as shown for a 1 M $LiClO_4$ solution of $CF_3MMSF$. Electrolyte elements comprising such high conductivity, relatively non-volatile electrolyte solvents are highly suitable for use in rechargeable electrochemical cells and other devices such as super capacitors. Furthermore it has been found that such sulfones are non-reactive with moisture.

Although many electrolyte solvents and lithium salts, and combinations thereof, have been proposed for use in secondary lithium cells, many exhibit the disadvantage for high voltage cells of oxidative decomposition of the electrolyte at voltages of about 5 V or below. Examples of this include: (a) Tarascon and Guyomard, *J. Elecfrochem. Soc.*, 1991, 138, 2864–2868 where the upper voltage range of a potential scan was limited to 4.5 V vs. Li/Li$^+$ because of break down of the electrolyte at higher potentials (4.6 V vs. Li/Li$^+$) in a I M $LiClO_4$ 50:50 EC (ethylene carbonate):DME (dirnethoxyethane) electrolyte; (b) Guyomard and Tarascon, *J. Electrochem. Soc.*, 1993, 140, 3071–3081 where a limit of 4.8 V vs. Li in a 1 M $LiPF_6$ 50:50 EC:dimethyl carbonate electrolyte was observed; and (c) Emn-Eli et al., *J. Electrochem. Soc.*, 1997, 144, L205–L207 where the onset of electrolyte oxidation at 5. IV for an electrolyte composition comprising 1.2 M $LiPF_6$ in ethylene carbonate (EC):dimethyl carbonate (2:3 by volume) was reported. The need for electrolyte compositions which do not decompose at high potentials is emphasized by the recent recommendation of Zhong et al., *J. Electrochem. Soc.*, 1997, 144, 205–213, that certain lithium ion cathode materials should be charged to above 5 V. Surprisingly the electrolytes of the present invention remain unaffected at potentials above about 5 V vs. Li. For example EMSF and ethyl-sec-butyl sulfone (EsBSF) remain unaffected until 5.8 V vs. Li.

While we do not wish not to be bound by any theory, we believe that the high oxidation resistance of the ambient temperature electrolyte solutions of the present invention result from the stability of the —$SO_2$— group when in a non-cyclic, non-symmetric sulfone structure, characterized by freezing temperatures low enough to enable utilization in ambient temperature applications. When such a sulfone is utilized as a solvent to dissolve inorganic electrolyte salts of highly oxidation resistant anions such as $ClO_4^-$, $CF_3SO_3^-$ (triflate), and in particular, bis(trifluoromethane sulfonyl) imide (—$N(CF_3SO_2)_2$, lithium imide), then solutions which combine exceptional oxidation resistance with high ambient temperature conductivity are obtained as, for example, shown in FIG. 1.

Further it has been found that alkali metal solutions comprising certain non-cyclic, non-symmetrical sulfones of the present invention, provide a media from which lithium ions can be reversibly intercalated into graphite to the stage of Li:C ratio of 1:6 without the undesirable effect of any ex-foliation of the graphite. Previously this capability has only been observed with the alkylene carbonates, ethylene carbonate (EC) and ethylmethyl carbonate. This is illustrated in FIG. 4 for EsBSF electrolyte solvents of the present invention. This is particularly useful in the application of electrolyte solvents of the present invention to electrolytic cells that comprise electrodes that undergo intercalation/de-intercalation of lithium ions during cell cycling.

In the EsBSF electrolyte, solvent the room temperature conductivity of 1 M lithium imide electrolyte solutions is insufficient to permit practical acceptable performance. However, it has been found that this practical limitation may be overcome by suitable addition of a electrolyte co-solvent to the electrolyte element. Suitable co-solvents are cyclic carbonate solvents, as described, for example, in FIG. 4(c) and Example 8.

Figure 4A:
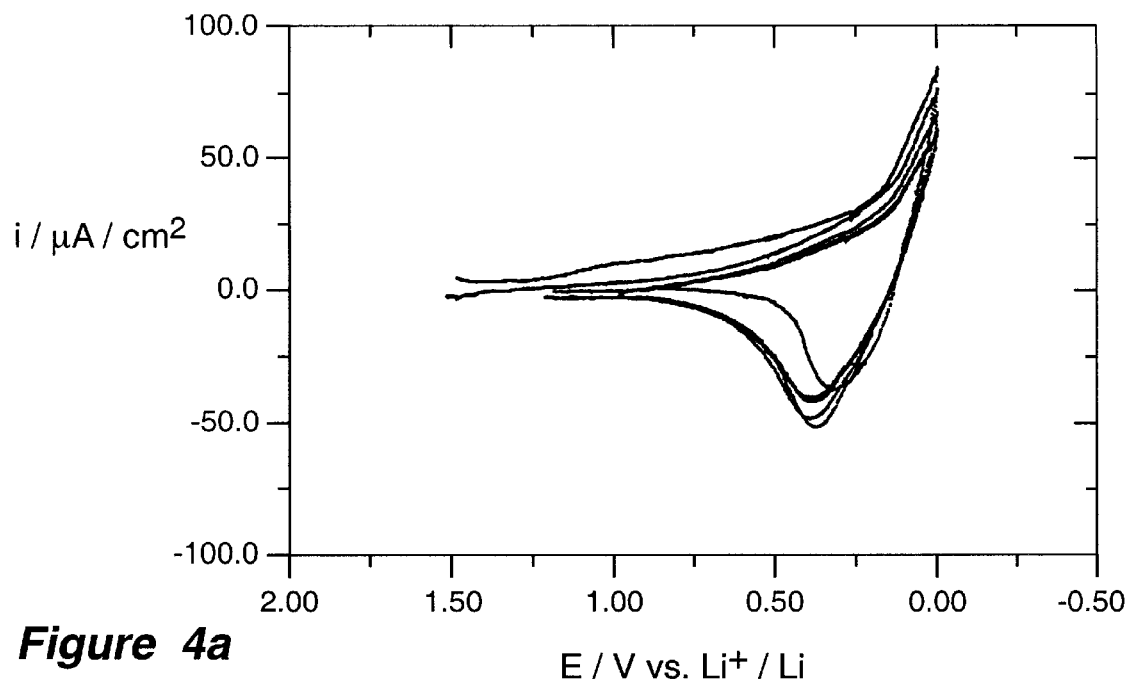
FIG. 4(a) shows the cyclic voltammogram of a 1 M lithium imide/ethyl-sec-butyl sulfone (EsBSF) solution at a working composite graphite electrode with counter and reference lithium electrodes. The scan rate was 0.1 mV/s (cycle number as indicated) with an electrode working area of 0.23 $cm^2$.
Figure 4B:
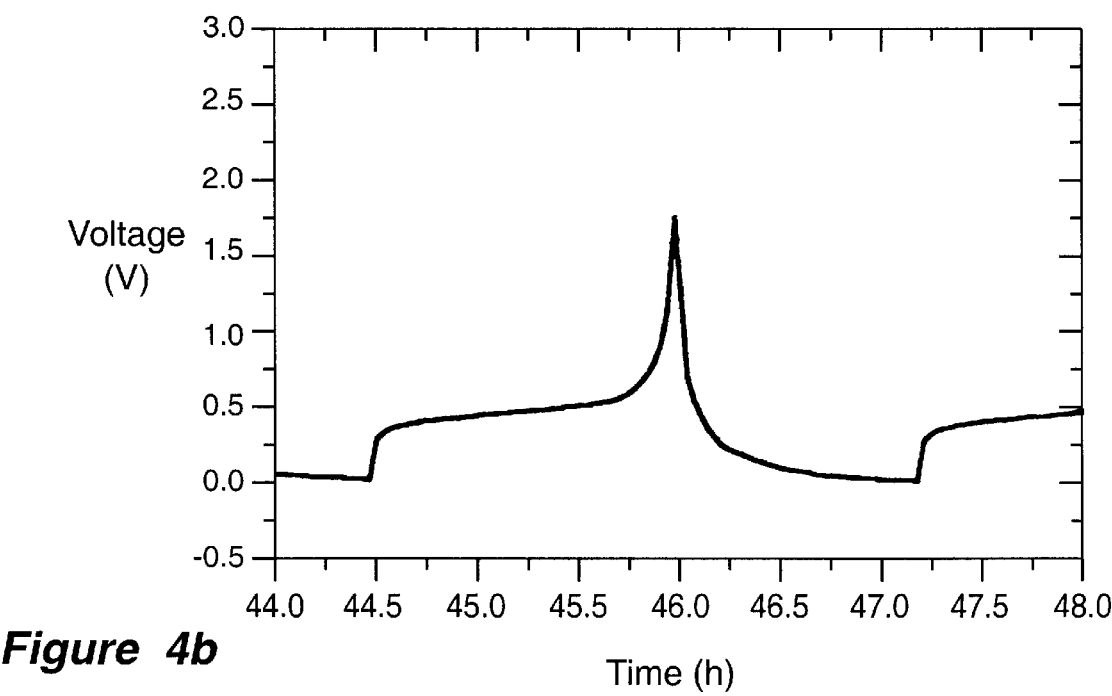
FIG. 4(b) shows the charge-discharge curve for a working composite graphite electrode (active material 0.45 $mg/cm^2$) with a counter lithium electrode in 1 M lithium imide/EsBSF solution. The charge rate was 0.105 $mA/cm^2$.
Figure 4C:
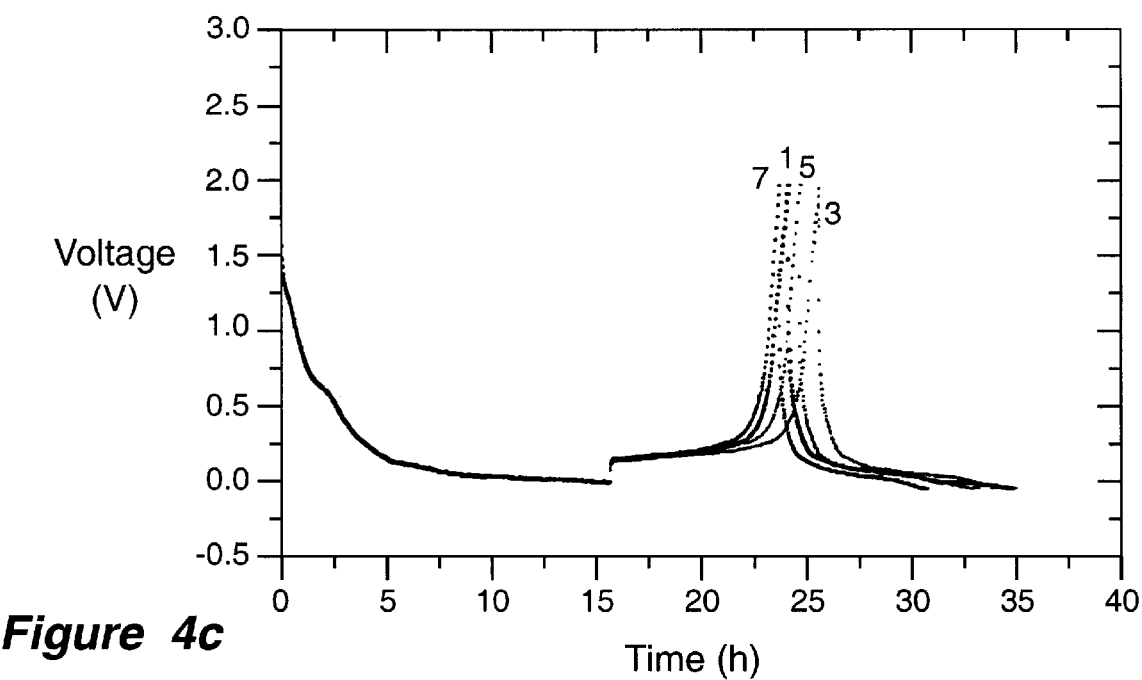
FIG. 4(c) shows the charge-discharge curves for a working graphite electrode with a counter lithium electrode in a mixed electrolyte solution comprising EsBSF/etbylene carbonate (EC) (1:1 by volume) with 1 M lithium imide salt.

Preferred for the reversible intercalation/deintercalation of lithium into graphite is an electrolyte solvent comprising EsBSF and an alkylene carbonate. Most preferred is a electrolyte solvent comprising EsBSF and ethylene carbonate. This mixed electrolyte solvent has good performance at ambient temperature as shown in FIG. 4(c).

Fluorinated Non-Cyclic, Non-Symmetrical Sulfones

Another aspect of the present invention pertains to novel fluorinated, non-cyclic, non-symmetrical sulfones, which are useful as electrolyte solvents in electrolyte elements, which are partially or fully fluorinated, and which are of the general formula:

$$R^1\text{—}SO_2\text{—}R^2$$

wherein $R^1$ is a linear or branched partially or fully fluorinated alkyl group having 1 to 7 carbon atoms, $R^1$ is a linear or branched alkyl or partially or fully fluorinated linear or branched alkyl group having 1 to 7 carbon atoms, wherein $R^1$ and $R^2$ are different; and wherein —$SO_2$— denotes the sulfone group. In one embodiment, $R^1$ and $R^2$ have 1 to 4 carbon atoms. Examples of linear fluorinated alkyl groups and branched fluorinated alkyl groups are shown above.

In one embodiment, the novel non-cyclic, non-symmetrical sulfones of the present invention are substituted with perfluoromethyl (trifluoromethyl, —$CF_3$), perfluoromethylene (—$CF_2$—) or —CF< groups. Substitution of a methyl, —$CH_3$, group by a perfluoromethyl, —$CF_3$, is surprisingly found to advantageously decrease the viscosity of the sulfone, thereby increasing the conductivity of the electrolyte solutions and increasing the penetration of the electrolytes into the cathode and separator in electrolytic cells at ambient conditions. Preferred are the novel fluorinated sulfones $CF_3CH_2SO_2CH_3$ (2,2,2-trifluoroethylmethyl sulfone, $CF_3MMSF$) and $CF_3CH_2CH_2SO_2CH_3$ ($CF_3EMSF$). Especially preferred is $CF_3MMSF$ which exhibits very high conductivity, for example, in lithium chlorate solutions.

In some embodiments, the fluorinated non-symmetrical, non-cyclic sulfone further offers superior wetting, penetration and other surfactant properties.

Sulfones of the present invention were prepared by a modification of the standard method for the preparation of mixed sulfides (Z. Brzozowski, Roczniki Chem., 1963, 37, 1096) followed by oxidation of the sulfide to the sulfone. Additionally they were prepared by direct oxidation of a commercially obtained ethyl methyl sulfide or higher sulfide, where commercially available, to the sulfone. The novel fluorinated non-symmetrical, non-cyclic sulfones were prepared by the method described in Example 5.

Rechargeable Battery Cells and Methods of Making Same

Still another aspect of the present invention pertains to a rechargeable, electric current producing cell which comprises:

(a) an anode;

(b) a cathode; and, (c) a non-aqueous electrolyte element that is stable in the presence of the anode and the cathode, wherein the electrolyte element comprises a non-symmetrical, non-cyclic sulfone, as described herein.

Yet another aspect of the present invention pertains to a method of forming a rechargeable, electric current producing cell, said method comprising the steps of:

(a) providing an anode;

(b) providing a cathode; and, (c) enclosing a non-aqueous electrolyte element that is stable in the presence of the anode and the cathode between said anode and said cathode, wherein the electrolyte element comprises a non-symmetrical, non-cyclic sulfone, as described herein.

The anode material may be comprised of one or more metals or metal alloys or a mixture of one or more metals and one or more alloys, wherein said metals are selected from the Group IA and IIA metals in the Periodic Table. For example, anodes comprising lithium and sodium are useful in the batteries of the present invention. The anode may also be alkali-metal intercalated carbon, such as $LiC_x$ where x is equal to or greater than 2. Also useful as anode materials are alkali-metal intercalated conductive polymers, such as lithium, sodium or potassium doped polyacetylenes, polyphenylenes, polyquinolines, and the like. Examples of suitable anodes include, but are not limited to, lithium metal, lithium-aluminum alloys, lithium-tin alloys, lithium-intercalated carbons, lithium-intercalated graphites, calcium metal, aluminum, sodium, sodium alloys, and the like. Preferred anodes are those selected from the group consisting of lithium metal; lithium-aluminum and lithium-tin alloys; and lithium-intercalated carbons and lithium-intercalated graphites.

The cathode may comprise any of the commonly used cathode active materials described in the various references cited herein. Examples of suitable cathode active materials include, but are not limited to, inorganic insertion oxides and sulfides, metal chalcogenides, elemental sulfur, organo-sulfur and carbon-sulfur polymers, conjugated polymers, liquid cathodes, and the like. Useful inorganic insertion oxides include $CoO_2$, $NiO_2$, $MnO_2$, $Mn_2O_4$, $V_6O_{13}$, $V_2O_5$, blends thereof and the like. Useful inorganic sulfides include $TiS_2$, $MoS_2$ and the like. Suitable conjugated polymers include polyacetylene, poly(phenylene vinylene), and polyaniline, and the like. Useful liquid cathodes include $SO_2$, $SOCl_2$, $SO_2Cl_2$, $POCl_3$, and the like. Useful organo-sulfur materials include those disclosed in U.S. Pat. Nos. 4,833,048; 4,917,974; 5,324,599; and 5,516,598, and Japanese patent publications No. JP 09-139213, published May, 27, 1997.

Further examples of useful cathode active materials include organo-sulfur polymer materials as described in U.S. Pat. No. 5,441,831. Still further useful materials carbon-sulfur materials are described in U.S. Pat. Nos. 5,601,947 and 5,529,860 and U.S. patent application Ser. Nos. 08/729, 713 and 08/602,323. Sulfur containing cathode active organic materials as described in these disclosures comprise, in their oxidized state, a polysulfide moiety of the formula, —$S_m$—, wherein m is an integer equal to or greater than 3. Further useful composite cathode compositions comprising organo-sulfur or elemental sulfur are described in U.S. application Ser. No. 08/859,996 to the common assignee.

The cathode may further comprise one or more materials selected from the group consisting of: binders, electrolytes, and conductive additives, usually to improve or simplify their fabrication as well as improve their electrical and electrochemical characteristics.

Useful electrolytes for cathodes include any liquid, solid, or solid-like materials capable of storing and transporting ions, so long as the electrolyte material is chemically inert with respect to the composite cathode material and the electrolyte material facilitates the transportation of ions. Examples of electrolytes for use in composite cathodes are described in detail above.

The choice of binder material may vary widely so long as it is inert with respect to the composite cathode materials. Useful binders are those materials, usually polymeric, that allow for ease of processing of battery electrode composites and are generally known to those skilled in the art of electrode fabrication. Examples of useful binders are organic polymers such as polytetrafluoroethylenes (TEFLON™), polyvinylidine fluorides ($PVF_2$ or PVDF), ethylene-propylene-diene (EPDM) rubbers, polyethylene oxides (PEO), UV curable acrylates, UV curable methacrylates, and UV curable divinylethers, and the like.

Useful conductive additives are those known to one skilled in the art of electrode fabrication and are such that they provide electrical connectivity to the majority of the electroactive materials in the composite cathode. Examples of useful conductive fillers include conductive carbons (e.g., carbon black), graphites, metal flakes, metal powders, electrically conductive polymers, and the like.

In those cases where binder and conductive filler are desired, the amounts of binder and conductive filler can vary widely and the amounts present will depend on the desired performance. Typically, when binders and conductive fillers are used, the amount of binder will vary greatly, but will generally be less than about 15 wt % of the composite cathode. Preferred amounts are less than 10 wt %. The amount of conductive filler used will also vary greatly and will typically be less than 20 wt % of the composite cathode. Preferred amounts of conductive additives are generally less than 12 wt %.

EXAMPLES

Several embodiments of the present invention are described in the following examples, which are offered by way of illustration and not by way of limitation.

Example 1

Preparation of Ethylmethyl Sulfone (EMSF)

Ethylmethyl sulfide (38.0 g, 99%, Aldrich Chemical Co., Milwaukee, Wis.) was oxidized in a mixture of 100 g 30% $H_2O_2$ and 100 g of glacial acetic acid in an ice water bath. After the bath temperature rose to ca. 30° C., an additional 100 g $H_2O_2$ was added (in 50% excess). After the reaction was completed, the reactants were boiled to decompose the unreacted $H_2O_2$. Excess NaOH was then used to neutralize the solution to pH 8. The resulting solution was evaporated to dryness to yield a solid material which was extracted with acetone. Removal of the acetone yielded white crystals of the crude product EMSF at room temperature, which were further purified by sublimation at ca. 30° C. under vacuum. The product was in the form of fine white needles

Example 2

Preparation of Ethylmethyl Sulfone (EMSF)

To a solution of 18 mL (0.2 mol) of ethylmethyl sulfide in 400 mL of acetic acid at ~15–20° C. was slowly added 200 mL of a 30% aqueous solution of hydrogen peroxide with stirring. When the addition was completed, the reaction mixture was stirred for an additional 72 hours at room temperature. After that, the reaction mixture was refluxed for 4 hours, and the acetic acid and unreacted hydrogen peroxide distilled out under reduced pressure. The residue was distilled under vacuum to yield 17.7 g (82%) product with a melting point of 31.5° C. (compared to the literature value of 32.5° C.).

Example 3

Characterization of EMSF

An electrolyte solution was prepared by dissolving (at ca. 80–100° C.) an electrolyte salt in the electrolyte solvent synthesized as described in the example 1. The conductivity of a 1 M $LiN(CF_3SO_2)_2$ (lithium imide, available from 3M Corporation, St. Paul, MN)/EMSF electrolyte solution was measured using a simple dip type Pt wire twin electrode cell in conjunction with an automated Hewlett-Packard Model HP4192A frequency analyzer (available from Hewlett-Packard Corporation, Palo Alto, Calif.), and using standard complex impedance plots to obtain the DC electrical (ionic) conductivity (frequency independent). The cell was thermostatted in an aluminium block, the temperature of which was controlled by a Eurotherm temperature controller. The conductivity curve for EMSF is shown in FIG. 1, curve ●. At 25° C. the conductivity was $10^{-2.2}$ $Scm^{-1}$.

Figure 2A:
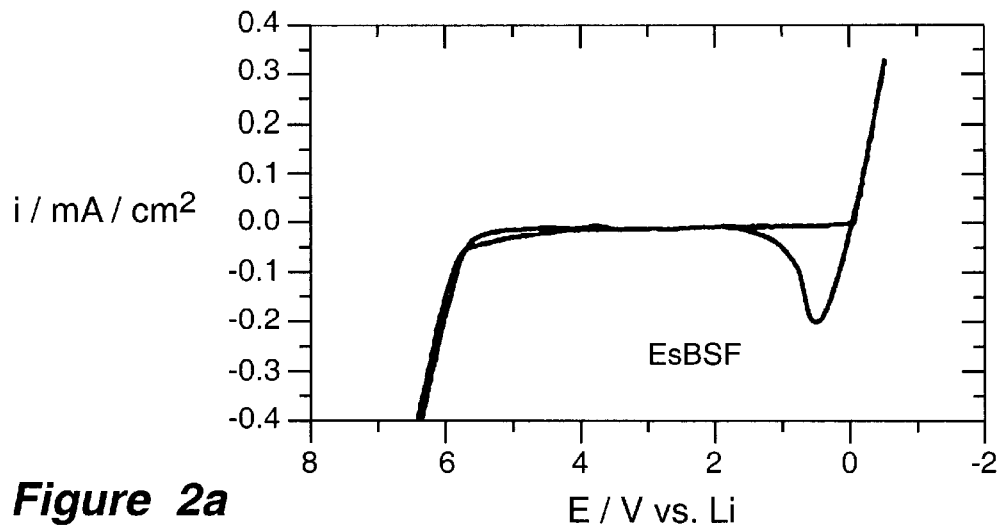
FIG. 2 shows the cyclic voltammograms of (a) ethyl-sec-butyl sulfone (EsBSF) and (b) ethylmethyl sulfone (EMSF) electrolyte solutions containing 1 M lithium imide salt. The cyclic voltammograms were performed at 10 mV/s at a Pt working electrode surface. For comparison the cyclic voltammogram of sulfolane (TMSF) is shown in (c).
Figure 2B:
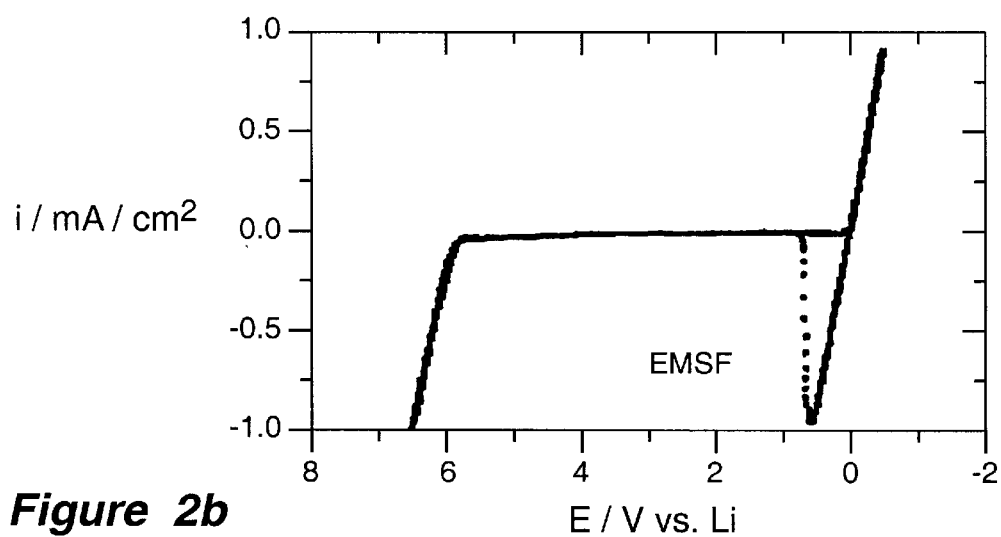
Figure 2C:
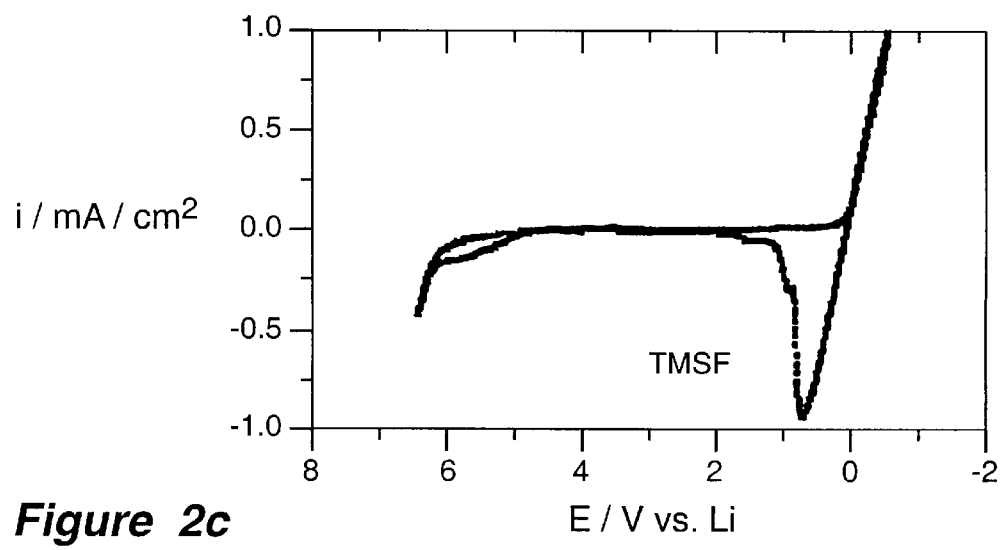
Figure 3A:
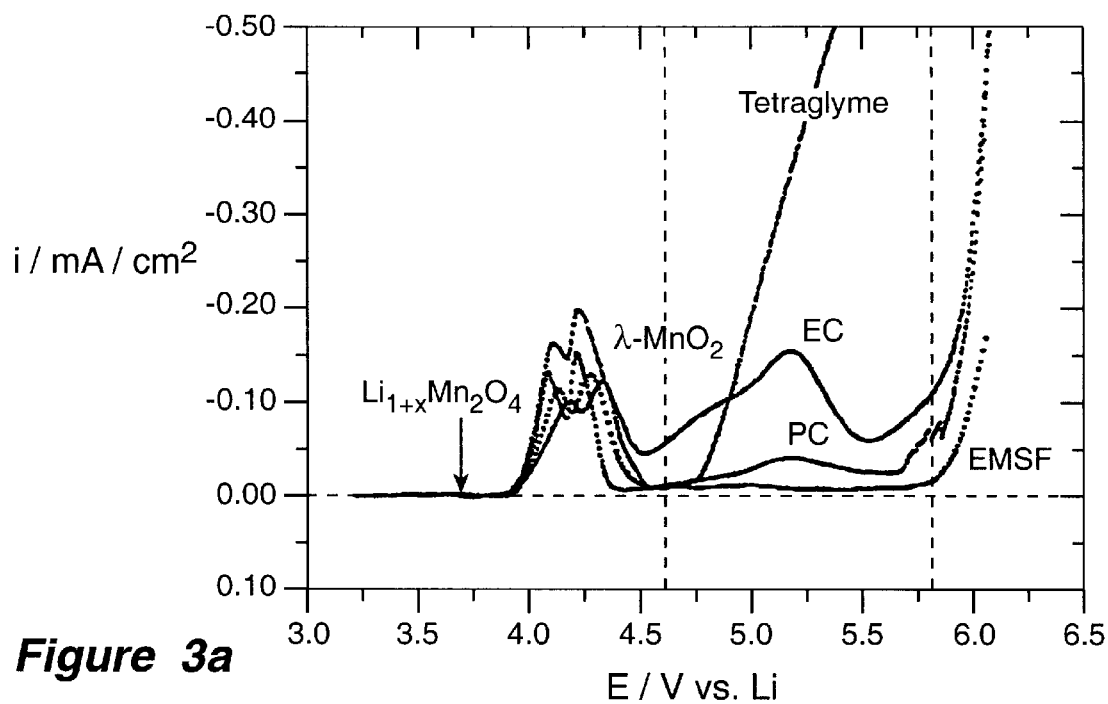
FIG. 3(a) shows 1 M lithium imide/ethylmethyl sulfone electrolyte solution compared to 1 M lithium imide solutions of propylene carbonate (PC), ethylene carbonate (EC) and tetraglyme.
Figure 3B:
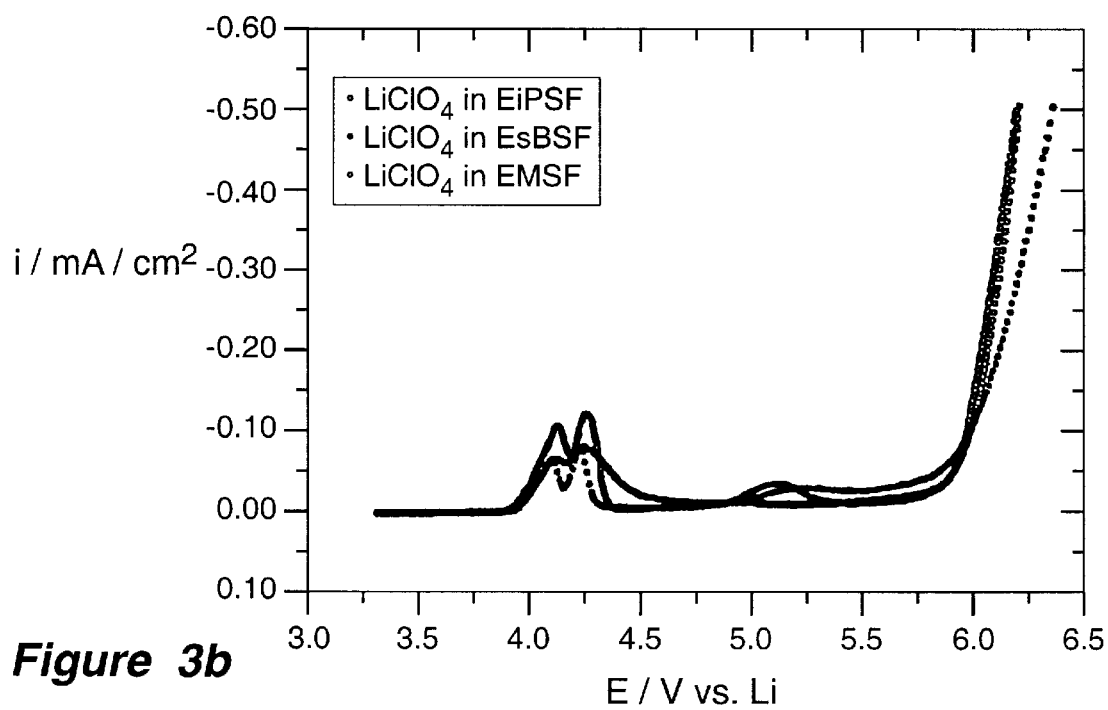
FIG. 3(b) shows 1 M $LiClO_4$ electrolyte solutions of ethyl-iso-propyl sulfone (EiPSF), EsBSF and EMSF.

The cyclic voltammogram of the 1 M lithium imide/EMSF electrolyte solution was recorded at 1.0 mV/s at a Pt working electrode surface with a lithium reference and counter electrode, as shown in FIG. 2. The electrolyte solution exhibited a high electrochemical window, compared to the control electrolyte solvent, sulfolane (tetramethylene sulfone available from Aldrich Chemical Co., Milwaukee, Wis., and purified before use), measured in the same type of electrolyte solution under the same conditions.

Example 4

Secondary Cell Employing EMSF Electrolyte Solvent

Cathodes were fabricated with a composition of 90 wt % $LiMn_2O_4$ (JEC sample No. 3, available from JEC Service Office, Torrance, Calif.), 7 wt % SAB carbon black (available from Chevron Corporation, Baytown, Tex.) and 3 wt % PVdF binder (Aldrich Chemical Co., Milwaukee, Wis.) by casting a cathode film from tetrahydroftiran solution onto a stainless steel current collector. The solvent was allowed to evaporate in air and then in vacuum at ca. 80–100° C. The cathode film was compressed between two stainless steel plates that were strewed together before assembly into test cells.

Figure 5A:
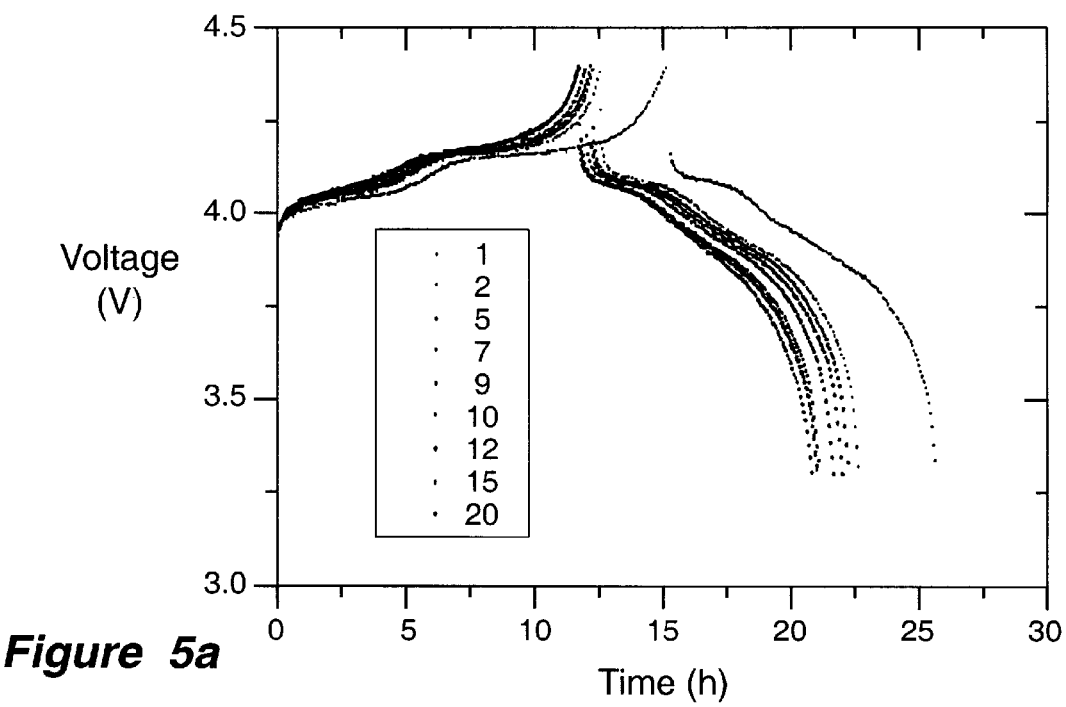
FIG. 5 shows the charge-discharge profile of test cells with composite cathodes prepared as described in Example 4 and 1 M lithium imide in EMSF electrolyte solution with (a) showing $LixMn_2O_4$ cathode active material at a charge rate of 0.20 $mA/cm^2$ and (b) showing $LiCr_{0.15}Mn_{1.985}O_4$ cathode active material at a charge rate of 0.3 $mA/cm^2$.
Figure 5B:
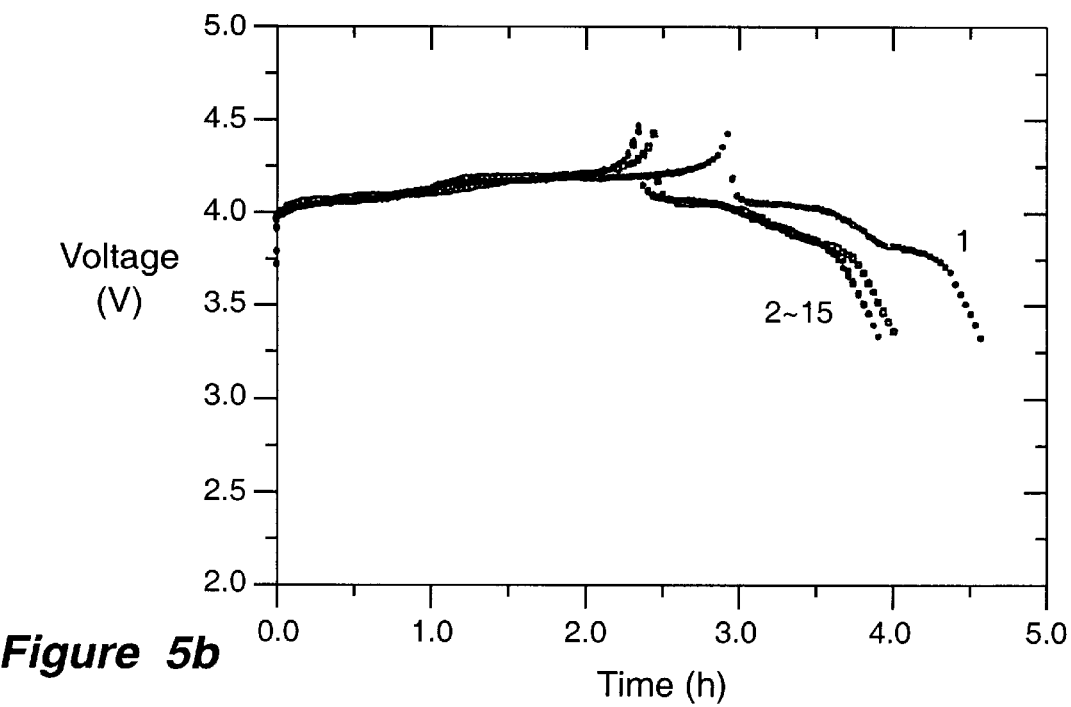

Test cells were assembled by placing a Whatman glass fiber filter soaked in the electrolyte solution of Example 3 between a lithium disc and the cathode. The cell was cycled between 3.3 and 4.4 V vs. Li. The voltage profile is shown in FIG. 5(*a*) at a charge rate of 0.20 $mA/cm^2$. The data show that the electrolyte supported the reversible energy storage and release over the first 20 cycles. Some capacity loss is observed due to the unstabilized manganate electroactive cathode material.

A second cell was prepared with a cathode active material comprising $LiCr_{0.15}Mn_{1.985}O_4$ (Covalent Associates, Inc., Woburn, Mass.), and a cathode film composition of 90 wt % $LiCr_{0.15}Mn_{1.985}O_4$, 7 wt % SAB carbon black and 3 wt % PVdF binder was prepared as above. The voltage profile of the cell is shown in FIG. 5(*b*) at a charge rate of 0.3 $mA/cm^2$. The 1 M Li imide electrolyte showed the stable cycling of this more stable cathode over the first 20 cycles.

Example 5

Preparation of $CF_3CH_2SO_2CH_3$ ($CF_3MMSF$)

76.0 g of thiourea was added to 63.0 g of dimethylsulfate in 50 mL $H_2O$ at room temperature. The mixture was brought up to boiling and kept at reflux for 2 hours. After cooling to room temperature, 50.0 g of NaOH was added to the resultant S-alkylated intermediate to yield the precursor methyl sulfide anion. To 50 mL of the methylsulfide precursor solution containing ca. 0.10 mole of methyl sulfide was mixed 1 0.0 g of $CF_3CH_2Cl$ at 0° C. in a stainless steel Parr acid absorption bomb with a TEFLON™ liner. The sealed bomb was heated to 100° C. overnight. The intermediate product, $CF_3CH_2SCH_3$ was steam distilled to give a 65% yield, and then oxidized in a mixture of 1:1 by wt 30% $H_2O_2$ (in 50% excess) and glacial acetic acid. After the removal of $H_2O$ and acetic acid by evaporation, the product, $CF_3CH_2SO_2CH_3$ was distilled under vacuum at 87–100° C.

Example 6

Characterization of $CF_3MMSF$

A 1 M $LiClO_4$ (Aldrich Chemical Co., Milwaukee, Wis.) electrolyte solution was prepared by dissolving (ca. 80–100° C.) the salt in $CF_3MMSF$ electrolyte solvent, prepared as described in Example 5. The high conductivity, measured as described in Example 3, of the resulting solution is shown in FIG. 1, curve V. At 25° C. the conductivity was $10^{-2.05}$ $Scm^{-1}$.

Example 7

Preparation of Ethyl Sec-Butyl Sulfone (EsBSF)

To 31.0 g of ethane thiol (Aldrich Chemical Co., Milwaukee, Wis.) was gradually added with stirring 25.0 g NaOH in an ice water bath. The rate of addition was controlled so as not to raise the temperature over 40° C. After cooling to ambient temperature, 46.3 g of sec-butyl chloride was added drop wise with vigorous stirring. To complete the reaction, the reaction mixture was refluxed. The product, ethyl-sec-butyl sulfide was steam distilled from the mixture with a 82% yield. This was further oxidized with $H_2O_2$ and acetic acid, as described in Example 1, to yield ethyl-sec-butyl sulfone.

Example 8

Characterization of EsBSF

An electrolyte solution was prepared by dissolving 1 M lithium imide salt in EsBSF electrolyte solvent, prepared as described in Example 7. At 25° C. the conductivity of the electrolyte solution was $10^{-2.60}$ $Scm^{-1}$.

The cyclic voltammogram of the electrolyte solution was recorded at 0.1 mV/s at a Pt working electrode surface as shown in FIG. 2. The electrolyte solution exhibited a high electrochemical window, compared to the control, sulfolane, measured under the same conditions.

The cyclic voltammogram of a Li/Im-EsBSF electrolyte solution was measured on a graphite working electrode with counter and reference lithium electrodes. The reversible lithium intercalation/deintercalation was observed as shown in FIG. 4(a) at a scan rate of 0.1 mV/s with a working area of 0.23 $cm^2$. This result is very similar to that observed for other carbonate systems.

The performance of lithium imide-EsBSF electrolyte solvent in lithium-ion cells was further measured using a graphite cathode and a lithium anode in a test cell. The charge-discharge curve for 1 M lithium imide/EsBSF electrolyte solution at a working composite graphite electrode with a counter lithium electrode is shown in FIG. 4(b). The charge rate was 0.105 $mA/cm^2$. It is seen in this figure that the intercalation/deintercalation levels are 0.2 V higher than expected. When the cathode load in unit area is increased to a reasonable standard (ca. 20 $mg/cm^2$), the utilization of the active material will drop to about 40%. This behavior is attributed to the relatively low conductivity, as well as high viscosity, of the EsBSF based electrolyte solution at ambient temperatures. This behavior can be overcome by use of a mixed electrolyte solution, for example, comprising EsBSF and ethylene carbonate. The improved performance of a 1 M lithium imide/EsBSF:ethylene carbonate (1:1 by volume) mixed electrolyte solution is shown in FIG. 4(c). It is expected that comparable performance will be obtained using EsBSF alone when higher temperatures are applied to raise the conductivity.

Example 9

Electrochemical Measurement of Li Plating/Stripping Efficiency

The lithium plating/stripping efficiency was measured potentiostatically with a three electrode cell comprising a lithium counter electrode, a lithium reference electrode, and a Ni working electrode. The area of the electrodes are approximately 1.0, 1.0, and $9.8 \times 10^{-4}$ $cm^2$, respectively. The two lithium electrodes were suspended in the solution at a distance of about 0.75 cm apart, with the Ni working electrode placed between them.

1 M lithium imide electrolyte solutions were prepared from ethyl-sec-butyl sulfone (EsBSF) (Example 7) and ethylmethyl sulfone (EMSF) (Example 2), and DME (dimethoxyethane, available from Grant Chemical, Zachary, La.).

A Solartron SI 1287 electrochemical interface, computer controlled by Corrware software was used to perform the measurements. The working electrode was held at a treatment potential of +0.5V vs. Li/Li$^+$ for a period of between 30 to 50 seconds. The working electrode was then subjected to alternating plating/stripping potentials for five successive tests, with a treatment step (as described above) between each test. The testing potentials are given in the table below, and the testing periods run from 10 to 50 seconds.

The efficiency was calculated as the ratio of stripping to deposition charges. The values shown in the table below. These results show that Li cycling efficiency is higher in the methyl ethyl sulfone solution than in the sulfolane solution.

| Electrolyte Element | plating pot., V vs. Li/ Li$^+$ | stripping pot., V vs. Li/ Li$^+$ | test 1 eff., % | test 2 eff., % | test 3 eff., % | test 4 eff., % | test 5 eff., % |
|---|---|---|---|---|---|---|---|
| DME | −0.3 | +0.4 | 14.0 | 8.8 | 6.0 | 5.6 | 6.6 |
| 20% EsBSF in DME | −0.2 | +0.4 | 23.7 | 20.5 | 14.0 | 5.6 | 8.2 |

-continued

| Electrolyte Element | plating pot., V vs. Li/ Li+ | stripping pot., V vs. Li/ Li+ | test 1 eff., % | test 2 eff., % | test 3 eff., % | test 4 eff., % | test 5 eff., % |
|---|---|---|---|---|---|---|---|
| sulfolane | −0.2 | +0.4 | 46.4 | 62.6 | 71.0 | 75.3 | 75.8 |
| EMSF | −0.4 | +0.5 | 71.1 | 77.5 | 80.2 | 79.0 | 79.7 |

Example 10

Stability Towards Lithium

Lithium foil was immersed in samples of EMSF and EsBSF, and maintained at ca. 80° C. for 24 hours. At the end of this time the lithium foil had maintained its luster. Upon prolonged treatment (>2 days) the lithium gradually becomes gray and darkens with time. At room temperature the lithium foil is unaffected even after periods of more than 5 weeks.

Example 11

Salt Solubility

Lithium bistrifluromethanesulfone imide (lithium imide) was dissolved in EMSF at 80–100° C. EMSF dissolved lithium imide with concentrations greater than 2.4 M without precipitation observed when the solutions were cooled to room temperature.

While the invention has been described in detail and with reference to specific embodiments thereof, it will be apparent to one skilled in the art that various changes and modifications can be made without departing from the spirit and scope thereof.

What is claimed is:

1. An electrolyte element for use in an electric current producing cell, said electrolyte element-comprising:
   (i) one or more ionic electrolyte salts; and,
   (ii) a non-aqueous electrolyte solvent, which solvent comprises one or more non-symmetrical, non-cyclic sulfones of the general formula:

$R^1$—$SO_2$—$R^2$ wherein:
   $R^1$ and $R^2$ are independently linear or branched alkyl groups having 1 to 7 carbon atoms; and,
   $R^1$ and $R^2$ are different.

2. The electrolyte element of claim 1, wherein $R^1$ and $R^2$ are independently linear or branched alkyl groups having 1 to 4 carbon atoms.

3. The electrolyte element of claim 1, wherein said alkyl group is selected from the group consisting of:
   methyl (—$CH_3$),
   ethyl (—$CH_2CH_3$),
   n-propyl (—$CH_2CH_2CH_3$),
   n-butyl (—$CH_2CH_2CH_2CH_3$),
   n-pentyl (—$CH_2CH_2CH_2CH_2CH_3$),
   n-hexyl (—$CH_2CH_2CH_2CH_2CH_2CH_3$),
   n-heptyl (—$CH_2CH_2CH_2CH_2CH_2CH_2CH_3$),
   iso-propyl (—$CH(CH_3)_2$),
   iso-butyl (—$CH_2CH(CH_3)_2$),
   sec-butyl (—$CH(CH_3)(CH_2CH_3)$),
   tert-butyl (—$C(CH_3)_3$), and,
   iso-pentyl (—$CH_2CH_2CH(CH_3)_2$).

4. The electrolyte element of claim 1, wherein said sulfone is selected from the group consisting of: ethylmethyl sulfone and ethyl-sec-butyl-sulfone.

5. The electrolyte element of claim 1, wherein the ionic electrolyte salt is selected from the group consisting of:
   $MClO_4$, $MAsF_6$, MSCN, $MSO_3CF_3$, $MSO_3CH_3$, $MBF_4$, $MB(Ph)_4$, $MPF_6$,

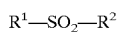

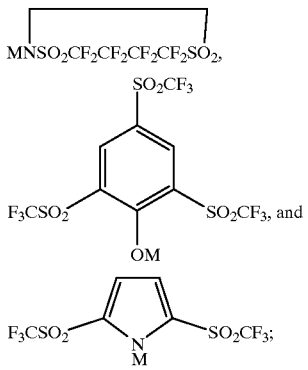

where M is Li or Na.

6. The electrolyte element of claim 1, wherein said electrolyte element further comprises one or more liquid electrolyte co-solvents.

7. The electrolyte element of claim 6, wherein said electrolyte co-solvent is selected from the group consisting of: carbonates, N-methyl acetamide, acetonitrile, symmetric sulfones, sulfolanes, polyethylene glycols, 1,3-dioxolanes, glymes, siloxanes, and ethylene oxide grafted siloxanes, and blends thereof.

8. The electrolyte element of claim 1, wherein said electrolyte element comprises a liquid electrolyte.

9. The electrolyte element of claim 8, wherein said electrolyte element comprises a porous separator.

10. The electrolyte element of claim 1, wherein said electrolyte element comprises a polymer electrolyte or a gel polymer electrolyte.

11. The electrolyte element of claim 10, wherein said polymer electrolyte comprises:
    (i) one or more polymers selected from the group consisting of: polyethers, polyethylene oxides, polyimides, polyphosphazenes, polyacrylonitriles, polysiloxanes, polyether grafted polysiloxanes, derivatives of the foregoing, copolymers of the foregoing, crosslinked and network structures of the foregoing and blends of the foregoing; and,
    (ii) an ionic electrolyte salt.

12. The electrolyte element of claim 10, wherein said gel-polymer electrolyte comprises:
    (i) a polymer matrix selected from the group consisting of: polyethylene oxides, polypropylene oxides, polyacrylonitriles, polysiloxanes, polyimides, polyethers, sulfonated polyimides, perfluorinated membranes (Nafion™ resins), polyethylene glycols, polyethylene glycol-bis-(methyl acrylates), polyethylene glycol-bis(methyl methacrylates), derivatives of the foregoing, copolymers of the foregoing, crosslinked and network structures of the foregoing, blends of the foregoing; and, (ii) an ionic electrolyte salt.

13. The electrolyte element of claim 1, wherein said electrolyte element is stable to oxidation at greater than 5.0 V vs. lithium.

14. The electrolyte element of claim 1, wherein said electrolyte element is stable to oxidation at greater than 5.5 V vs. 1 lithium.

15. The electrolyte element of claim 1, wherein said electrolyte element further comprises a polysulfide additive.

16. An electrolyte element for use in an electric current producing cell, said electrolyte element comprising:

(i) one or more ionic electrolyte salts; and, (ii) a non-aqueous electrolyte solvent, which solvent comprises one or more fluorinated, non-symmetrical, non-cyclic sulfones of the general formula:

$$R^1\text{—}SO_2\text{—}R^2$$

wherein:

$R^1$ is a linear or branched partially or fully fluorinated alkyl group are having 1 to 7 carbon atoms;

$R^2$ is a linear or branched alkyl or partially or fully fluorinated linear or branched alkyl group are having 1 to 7 carbon atoms; and, $R^1$ and $R^2$ are different.

17. The electrolyte element of claim 16, wherein $R^1$ and $R^2$ have 1 to 4 carbon atoms.

18. The electrolyte element of claim 16, wherein said fluorinated, non-symmetrical, non-cyclic sulfone comprises one or more terminal —CF$_3$ groups.

19. The electrolyte element of claim 16, wherein said fluorinated, non-symmetrical, non-cyclic sulfone comprises one or more —CF$_2$— or —CF< groups.

20. The electrolyte element of claim 16, wherein said $R^1$ is selected from the group consisting of:

trifluoromethyl (—CF$_3$),
2,2,2-trifluoroethyl (—CH$_2$CF$_3$),
1,1-difluoroethyl (—CF$_2$CH$_3$),
perfluoroethyl (—CF$_2$CF$_3$),
3,3,3-trifluoro-n-propyl (—CH$_2$CH$_2$CF$_3$),
2,2-difluoro-n-propyl (—CH$_2$CF$_2$CH$_3$),
1,1 -difluoro-n-propyl (—CF$_2$CH$_2$CH$_3$),
2,2,3,3,3-pentafluoro-n-propyl (—CH$_2$CF$_2$CF$_3$),
1,3,3,3-pentafluoro-n-propyl (—CF$_2$CH$_2$CF$_3$),
perfluoro-n-propyl (—CF$_2$CF$_2$CF$_3$),
perfluoro-n-butyl (—CF$_2$CF$_2$CF$_2$CF$_3$),
perfluoro-n-pentyl (—CF$_2$CF$_2$CF$_2$CF$_2$CF$_3$),
perfluoro-n-hexyl (—CF$_2$CF$_2$CF$_2$CF$_2$CF$_2$CF$_3$),
perfluoro-n-heptyl (—CF$_2$CF$_2$CF$_2$CF$_2$CF$_2$CF$_2$CF$_3$),
—CF(CH$_3$)$_2$,
—CH(CH$_3$)(CF$_3$),
—CH(CF$_3$)$_2$,
—CF(CF$_3$)$_2$,
—CF$_2$CH(CH$_3$)$_2$,
—CH$_2$CF(CH$_3$)$_2$,
—CH$_2$CH(CH$_3$)(CF$_3$),
—CH$_2$CH (CF$_3$)$_2$,
—CF$_2$CF(CF$_3$)$_2$, and,
—C(CF$_3$)$_3$.

21. The electrolyte element of claim 16, wherein $R^2$ is selected from the group consisting of:

methyl (—CH$_3$),
ethyl (—CH$_2$CH$_3$),
n-propyl (—CH$_2$CH$_2$CH$_3$),
n-butyl (—CH$_2$CH$_2$CH$_2$CH$_3$),
n-pentyl (—CH$_2$CH$_2$CH$_2$CH$_2$CH$_3$),
n-hexyl (—CH$_2$CH$_2$CH$_2$CH$_2$CH$_2$CH$_3$),
n-heptyl (—CH$_2$CH$_2$CH$_2$CH$_2$CH$_2$CH$_2$CH3),
iso-propyl (—CH(CH$_3$)$_2$),
iso-butyl (—CH$_2$CH(CH$_3$)$_2$),
sec-butyl (—CH(CH$_3$)(CH$_2$CH$_3$)),
tert-butyl (—C(CH$_3$)$_3$), and,
iso-pentyl (—CH$_2$CH$_2$CH(CH$_3$)$_2$).

22. The electrolyte element of claim 16, wherein said sulfone is selected from the group consisting of: CF$_3$CH$_2$SO$_2$CH$_3$ and CF$_3$CH$_2$CH$_2$SO$_2$CH$_3$.

23. The electrolyte element of claim 16, wherein the ionic electrolyte salt is selected from the group consisting of:

MClO$_4$, MAsF$_6$, MSCN, MSO$_3$CF$_3$, MSO$_3$CH$_3$, MBF$_4$, MB(Ph)$_4$, MPF$_6$,

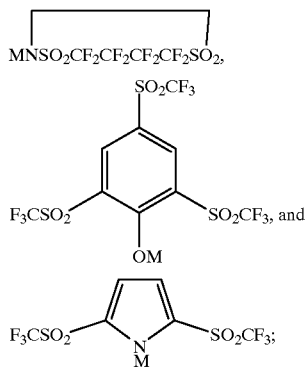

where M is Li or Na.

24. The electrolyte element of claim 16, wherein said electrolyte element further comprises one or more liquid electrolyte co-solvents.

25. The electrolyte element of claim 24, wherein said electrolyte co-solvent is selected from the group consisting of: carbonates, N-methyl acetamide, acetonitrile, symmetric sulfones, sulfolanes, polyethylene glycols, 1,3-dioxolanes, glymes, siloxanes, and ethylene oxide grafted siloxanes, and blends thereof.

26. The electrolyte element of claim 16, wherein said electrolyte element comprises a liquid electrolyte.

27. The electrolyte element of claim 26, wherein said electrolyte element comprises a porous separator.

28. The electrolyte element of claim 16, wherein said electrolyte element comprises a polymer electrolyte or a gel polymer electrolyte.

29. The electrolyte element of claim 28, wherein said polymer electrolyte comprises:

(i) one or more polymers selected from the group consisting of: polyethers, polyethylene oxides, polyimides, polyphosphazenes, polyacrylonitriles, polysiloxanes, polyether grafted polysiloxanes, derivatives of the foregoing, copolymers of the foregoing, crosslinked and network structures of the foregoing and blends of the foregoing; and, (ii) an ionic electrolyte salt.

30. The electrolyte element of claim 28, wherein said gel-polymer electrolyte comprises:

(i) a polymer matrix selected from the group consisting of: polyethylene oxides, polypropylene oxides, polyacrylonitriles, polysiloxanes, polyimides, polyethers, sulfonated polyimides, perfluorinated membranes (Nafion™ resins), polyethylene glycols, polyethylene glycol-bis-(methyl acrylates), polyethylene glycol-bis(methyl methacrylates), derivatives of the foregoing, copolymers of the foregoing, crosslinked and network structures of the foregoing, blends of the foregoing; and, (ii) an ionic electrolyte salt.

31. The electrolyte element of claim 16, wherein said electrolyte element is stable to oxidation at greater than 5.0 V vs. lithium.

32. The electrolyte element of claim 16, wherein said electrolyte element is stable to oxidation at greater than 5.5 V vs. lithium.

33. The electrolyte element of claim 16, wherein said electrolyte element further comprises a polysulfide additive.

34. An electric current producing cell comprising:

(a) a cathode;

(b) an anode; and, (c) a non-aqueous electrolyte element, wherein said electrolyte element comprises:

(i) one or more ionic electrolyte salts; and, (ii) a non-aqueous electrolyte solvent, which solvent comprises one or more non-symmetrical, non-cyclic sulfones of the general formula:

$$R^1-SO_2-R^2$$

wherein:

$R^1$ and $R^2$ are independently linear or branched alkyl or partially or fully fluorinated linear or branched alkyl groups having 1 to 7 carbon atoms, and $R^1$ and $R^2$ are different;

wherein said electrolyte element is interposed between said cathode and said anode.

35. The cell of claim 34, wherein $R^1$ and $R^2$ have 1 to 4 carbon atoms.

36. The cell of claim 34, wherein said linear or branched alkyl group is selected from the group consisting of:

methyl (—CH$_3$),
ethyl (—CH$_2$CH$_3$),
n-propyl (—CH$_2$CH$_2$CH$_3$),
n-butyl (—CH$_2$CH$_2$CH$_2$CH$_3$),
n-pentyl (—CH$_2$CH$_2$CH$_2$CH$_2$CH$_3$),
n-hexyl (—CH$_2$CH$_2$CH$_2$CH$_2$CH$_2$CH$_3$),
n-heptyl (—CH$_2$CH$_2$CH$_2$CH$_2$CH$_2$CH$_2$CH$_3$),
iso-propyl (—CH (CH$_3$)$_2$),
iso-butyl (—CH$_2$CH (CH$_3$)$_2$),
sec-butyl (—CH (CH$_3$)(CH$_2$CH$_3$)),
tert-butyl (—C(CH$_3$)$_3$), and,
iso-pentyl (—CH$_2$CH$_2$CH (CH$_3$)$_2$).

37. The cell of claim 34, wherein said partially or fully fluorinated linear or branched alkyl group is selected from the group consisting of:

trifluoromethyl (—CF$_3$),
2,2,2-trifluoroethyl (—CH$_2$CF$_3$),
1,1-difluoroethyl (—CF$_2$CH$_3$),
perfluoroethyl (—CF$_2$CF$_3$),
3,3,3-trifluoro-n-propyl (—CH$_2$CH$_2$CF$_3$),
2,2-difluoro-n-propyl (—CH$_2$CF$_2$CH$_3$),
1,1-difluoro-n-propyl (—CF$_2$CH$_2$CH$_3$),
1,1,3,3,3-pentafluoro-n-propyl (—CF$_2$CH$_2$CF$_3$),
2,2,3,3,3-pentafluoro-n-propyl (—CH$_2$CF$_2$CF$_3$),
perfluoro-n-propyl (—CF$_2$CF$_2$CF$_3$),
perfluoro-n-butyl (—CF$_2$CF$_2$CF$_2$CF$_3$),
perfluoro-n-pentyl (—CF$_2$CF$_2$CF$_2$CF$_2$CF$_3$),
perfluoro-n-hexyl (—CF$_2$CF$_2$CF$_2$CF$_2$CF$_2$CF$_3$),
perfluoro-n-heptyl (—CF$_2$CF$_2$CF$_2$CF$_2$CF$_2$CF$_2$CF$_3$),
—CF(CH$_3$)$_2$,
—CH(CH$_3$)(CF$_3$),
—CH(CF$_3$)$_2$,
—CF(CF$_3$)$_2$,
—CF$_2$CH(CH$_3$)$_2$,
—CH$_2$CF(CH$_3$)$_2$,
—CH$_2$CH(CH$_3$)(CF$_3$),
—CH$_2$CH(CF$_3$)$_2$,
—CF$_2$CF(CF$_3$)$_2$, and,
—C(CF$_3$)$_3$.

38. The cell of claim 34, wherein said sulfone is selected from the group consisting of: ethylmethyl sulfone, ethyl-sec-butyl-sulfone, CF$_3$CH$_2$SO$_2$CH$_3$ and CF$_3$CH$_2$CH$_2$SO$_2$CH$_3$.

39. The cell of claim 34, wherein the ionic electrolyte salt is selected from the group consisting of:

MClO$_4$, MAsF$_6$, MSCN, MSO$_3$CF$_3$, MSO$_3$CH$_3$, MBF$_4$, MB(Ph)$_4$, MPF$_6$,

MNSO$_2$CF$_2$CF$_2$CF$_2$CF$_2$SO$_2$,

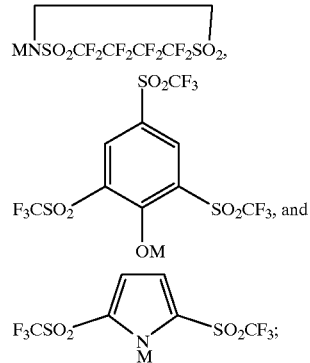

where M is Li or Na.

40. The cell of claim 34, wherein said electrolyte element further comprises one or more liquid electrolyte co-solvents.

41. The cell of claim 40, wherein said electrolyte co-solvent is selected from the group consisting of: carbonates, N-methyl acetamide, acetonitrile, symmetric sulfones, sulfolanes, polyethylene glycols, 1,3-dioxolanes, glymes, siloxanes, and ethylene oxide grafted siloxanes, and blends thereof.

42. The cell of claim 34, wherein said electrolyte element comprises a liquid electrolyte.

43. The cell of claim 42, wherein said electrolyte element comprises a porous separator.

44. The cell of claim 34, wherein said electrolyte element comprises a polymer electrolyte or a gel polymer electrolyte.

45. The cell of claim 44, wherein said polymer electrolyte comprises:
 (i) one or more polymers selected from the group consisting of: polyethers, polyethylene oxides, polyimides, polyphosphazenes, polyacrylonitriles, polysiloxanes, polyether grafted polysiloxanes, derivatives of the foregoing, copolymers of the foregoing, crosslinked and network structures of the foregoing and blends of the foregoing; and,
 (ii) an ionic electrolyte salt.

46. The cell of claim 44, wherein said gel-polymer electrolyte comprises:
 (i) a polymer matrix selected from the group consisting of: polyethylene oxides, polypropylene oxides, polyacrylonitriles, polysiloxanes, polyimides, polyethers, sulfonated polyimides, perfluorinated membranes (NafionTM resins), polyethylene glycols, polyethylene glycol-bis-(methyl acrylates), polyethylene glycol-bis(methyl methacrylates), derivatives of the foregoing, copolymers of the foregoing, crosslinked and network structures of the foregoing, blends of the foregoing; and,
 (ii) an ionic electrolyte salt.

47. The cell of claim 34, wherein said anode is selected from the group consisting of: lithium metal, lithium-aluminum alloys, lithium-tin alloys, lithium-intercalated carbons, and lithium-intercalated graphites.

48. The cell of claim 34, wherein said cathode comprises a cathode active material selected from the group consisting of: inorganic insertion oxides and sulfides, metal chalcogenides, elemental sulfur, organo-sulfur polymers, carbon-sulfur polymers, conjugated polymers and liquid cathodes.

49. The cell of claim 34, wherein said cathode further comprises one or materials selected from the group consisting of: binders, electrolytes and conductive additives.

* * * * *

UNITED STATES PATENT AND TRADEMARK OFFICE
CERTIFICATE OF CORRECTION

PATENT NO.    : 6,245,465 B1
DATED         : June 12, 2001
INVENTOR(S)   : Charles Austen Angell et al.

It is certified that error appears in the above-identified patent and that said Letters Patent is hereby corrected as shown below:

<u>Title page,</u>
Item [73], add -- Arizona Board of Regents, Tempe, AZ --

Signed and Sealed this

Tenth Day of September, 2002

*Attest:*

*Attesting Officer*

JAMES E. ROGAN
*Director of the United States Patent and Trademark Office*